(12) United States Patent
Ide

(10) Patent No.: US 11,163,174 B2
(45) Date of Patent: Nov. 2, 2021

(54) DISPLAY DEVICE

(71) Applicant: SEIKO EPSON CORPORATION, Tokyo (JP)

(72) Inventor: Mitsutaka Ide, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 188 days.

(21) Appl. No.: 16/667,953

(22) Filed: Oct. 30, 2019

(65) Prior Publication Data

US 2020/0133017 A1 Apr. 30, 2020

(30) Foreign Application Priority Data

Oct. 31, 2018 (JP) .............................. JP2018-205037

(51) Int. Cl.
*G02B 27/42* (2006.01)
*G02B 27/01* (2006.01)

(52) U.S. Cl.
CPC ...... *G02B 27/4211* (2013.01); *G02B 27/0172* (2013.01); *G02B 27/4216* (2013.01); *G02B 2027/0116* (2013.01); *G02B 2027/0147* (2013.01); *G02B 2027/0174* (2013.01); *G02B 2027/0178* (2013.01)

(58) Field of Classification Search
CPC ......... G02B 27/4211; G02B 27/42; G02B 27/4216; G02B 27/0172; G02B 2027/0116; G02B 2027/0147; G02B 2027/0174; G02B 2027/0178
USPC .......................................................... 359/13
See application file for complete search history.

(56) References Cited

U.S. PATENT DOCUMENTS

| | | | |
|---|---|---|---|
| 6,219,186 B1* | 4/2001 | Hebert ................. | G02B 27/017 |
| | | | 348/46 |
| 2017/0097507 A1* | 4/2017 | Yeoh .................... | G02B 26/103 |
| 2017/0115484 A1* | 4/2017 | Yokoyama ........... | G02B 5/1823 |
| 2017/0261751 A1 | 9/2017 | Noguchi et al. | |
| 2018/0151194 A1 | 5/2018 | Noguchi | |
| 2018/0239177 A1* | 8/2018 | Oh ........................ | G02B 6/0056 |
| 2019/0094536 A1* | 3/2019 | Tekolste ............... | G02B 5/1871 |
| 2019/0113751 A9* | 4/2019 | Waldern ................ | G02B 27/48 |
| 2020/0209629 A1* | 7/2020 | Suzuki ................. | H04N 9/3173 |

FOREIGN PATENT DOCUMENTS

| | | |
|---|---|---|
| JP | 2017-167181 A | 9/2017 |
| JP | 2018-087949 A | 6/2018 |

* cited by examiner

*Primary Examiner* — William R Alexander
(74) *Attorney, Agent, or Firm* — Oliff PLC

(57) ABSTRACT

A display device of the present disclosure includes, along an optical path of imaging light emitted from an imaging light generation device, a first optical portion having a positive power, a second optical portion including a first diffraction element and having a positive power, a third optical portion having a positive power, and a fourth optical portion including a second diffraction element and having a positive power. In the optical path, the first diffraction element and the second diffraction element diffract the imaging light at least along a primary diffraction plane and a secondary diffraction plane orthogonal to the primary diffraction plane, and a deflection force of the imaging light in the primary diffraction plane is greater than a deflection force of the imaging light in the secondary diffraction plane.

4 Claims, 17 Drawing Sheets

DISPLAY DEVICE

The present application is based on, and claims priority from JP Application Serial Number 2018-205037, filed on Oct. 31, 2018, the present disclosure of which is hereby incorporated by reference herein in its entirety.

BACKGROUND

1. Technical Field

The present disclosure relates to a display device that displays an image using a diffraction element.

2. Related Art

As a display device that uses a diffraction element such as a holographic element or the like, a display device in which a diffraction element deflects imaging light emitted from an imaging light generation device toward an eye of an observer has been proposed. In the diffraction element, interference fringes are optimized to obtain an optimum diffraction angle and optimum diffraction efficiency at a specific wavelength. Nevertheless, the imaging light has a predetermined spectral width with the specific wavelength at the center. Thus, light of peripheral wavelengths deviated from the specific wavelength may cause a decrease in resolution of an image. Therefore, a display device has been proposed in which imaging light emitted from an imaging light generation device is emitted by a first diffraction element of a reflection type toward a second diffraction element disposed in front of the first diffraction element, and the second diffraction element diffracts the imaging light emitted from the first diffraction element toward the eye of the observer. According to such a configuration, the first diffraction element can compensate for light of peripheral wavelengths and cancel color aberration, making it possible to suppress a decrease in resolution of an image caused by light having peripheral wavelengths deviated from the specific wavelength (refer to JP-A-2017-167181).

When wavelength compensation is performed for imaging light using two diffraction elements as disclosed in JP-A-2017-167181, lens power is required and, as a result, the problem arises that tolerances of optical components during the manufacture and assembly of the device become severe.

SUMMARY

In order to solve the above-described problems, a display device according to a first aspect of the present disclosure includes, along an optical path of imaging light emitted from an imaging light generation device, a first optical portion having a positive power, a second optical portion including a first diffraction element and having a positive power, a third optical portion having a positive power, and a fourth optical portion including a second diffraction element and having a positive power. The first diffraction element and the second diffraction element are configured to diffract the imaging light at least in a primary diffraction direction and a secondary diffraction direction orthogonal to the primary diffraction direction and, in the optical path, a deflection force of the imaging light in the primary diffraction direction is greater than a deflection force of the imaging light in the secondary diffraction direction.

A display device according to a second aspect of the present disclosure includes, along an optical path of imaging light emitted from an imaging light generation device, a first optical portion having a positive power, a second optical portion including a first diffraction element and having a positive power, a third optical portion having a positive power, and a fourth optical portion including a second diffraction element and having a positive power. The first diffraction element and the second diffraction element are configured to diffract the imaging light at least in a primary diffraction direction and a secondary diffraction direction orthogonal to the primary diffraction direction, and a number of intermediate images and pupils of the imaging light that are formed on a first plane in the primary diffraction direction of the optical path is greater than a number of intermediate images and pupils of the imaging light that are formed on a second plane in the secondary diffraction direction of the optical path.

A display device according to a third aspect of the present disclosure includes, along an optical path of imaging light emitted from an imaging light generation device, a first optical portion having a positive power, a second optical portion including a first diffraction element and having a positive power, a third optical portion having a positive power, and a fourth optical portion including a second diffraction element and having a positive power. In the optical path, the first diffraction element and the second diffraction element are configured to diffract the imaging light at least in a primary diffraction direction and a secondary diffraction direction orthogonal to the primary diffraction direction. In the primary diffraction plane, a first intermediate image of the primary diffraction plane in the imaging light is formed between the first optical portion and the third optical portion, and a second intermediate image of the primary diffraction plane in the imaging light is formed between the third optical portion and the fourth optical portion. In the secondary diffraction plane, a first intermediate image of the secondary diffraction plane in the imaging light is formed between the first optical portion and the third optical portion, and a second intermediate image of the secondary diffraction plane in the imaging light is formed between the third optical portion and the fourth optical portion. A first distance between the first intermediate image of the primary diffraction plane and the second intermediate image of the primary diffraction plane is greater than a second distance between the first intermediate image of the secondary diffraction plane and the second intermediate image of the secondary diffraction plane.

DESCRIPTION OF EXEMPLARY EMBODIMENTS

First Exemplary Embodiment

Exemplary embodiments of the present disclosure will be described below with reference to the accompanying drawings. Note that, in each of the drawings below, to make each of layers and each of members a recognizable size, each of the layers and each of the members are illustrated to be different from an actual scale and an actual angle.

Figure 1:
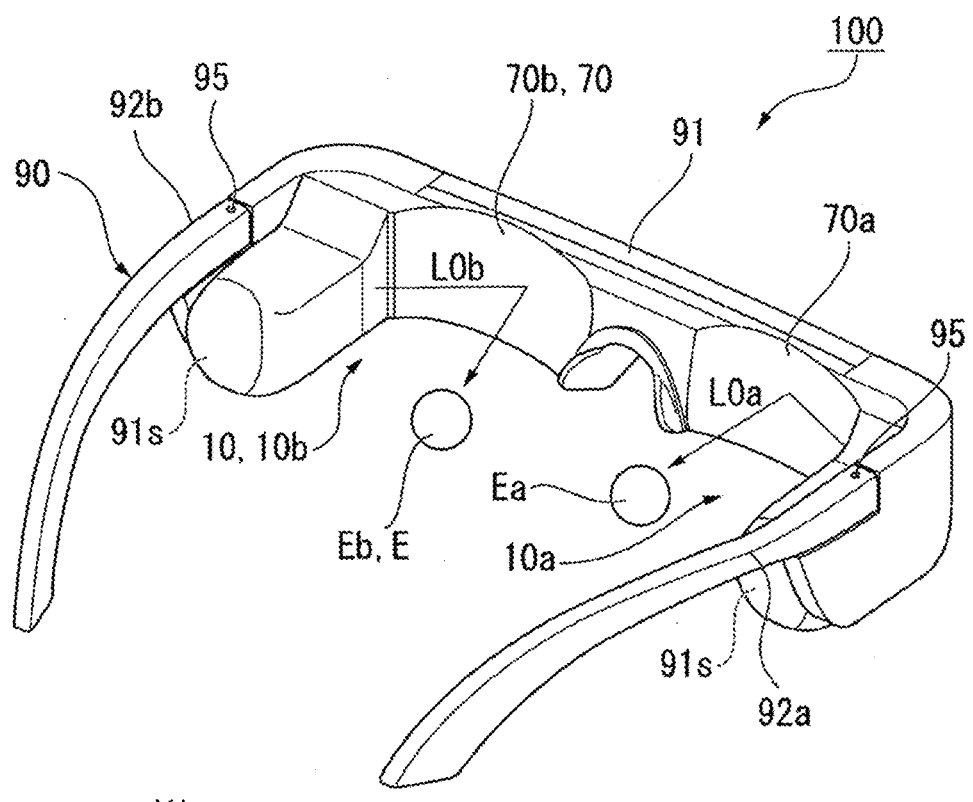
FIG. 1 is an external view illustrating one aspect of an external appearance of a display device according to a first exemplary embodiment of the disclosure.
Figure 1:
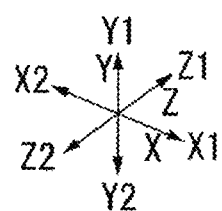
Figure 2:
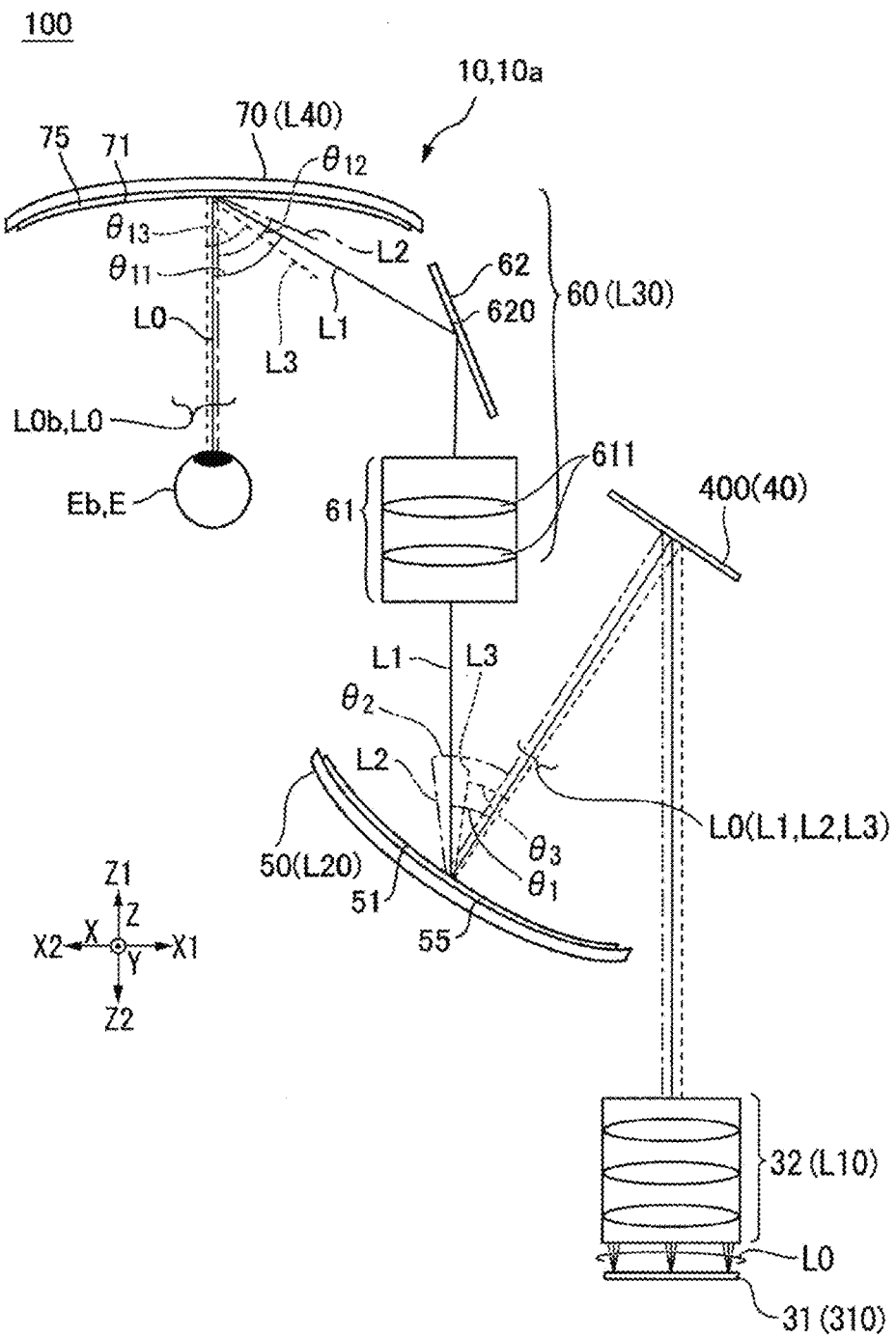
FIG. 2 is an explanatory view illustrating one aspect of an optical system of the display device.

FIG. 1 is an external view illustrating one aspect of a visual appearance of a display device 100 according to the present exemplary embodiment. FIG. 2 is an explanatory view illustrating one aspect of an optical system 10 of the display device 100 illustrated in FIG. 1. Note that, in FIG. 1 and FIG. 2, a front-back direction relative to an observer wearing the display device is referred to as a direction along a Z axis, an area in front of the observer wearing the display device, which is one side in the front-back direction, is referred to as a front side Z1, and an area in back of the observer wearing the display device, which is the other side in the front-back direction, is referred to as a back side Z2. Further, a left-right direction relative to the observer wearing the display device is referred to as a direction along an X axis, an area on the right of the observer wearing the display device, which is one side in the left-right direction, is referred to as a right side X1, and an area on the left of the observer wearing the display device, which is the other side in the left-right direction, is referred to as a left side X2. Further, an up-down direction relative to the observer wearing the display device is referred to as a direction along a Y axis, an area above the observer wearing the display device, which is one side in the up-down direction, is referred to as an upper side Y1, and an area below the observer wearing the display device, which is the other side in the up-down direction, is referred to as a lower side Y2.

The display device 100 illustrated in FIG. 1 is a head-mounted display device, and includes a right-eye optical system 10a that causes imaging light L0a to be incident on a right eye Ea, and a left-eye optical system 10b that causes imaging light L0b to be incident on a left eye Eb. The display device 100 is, for example, formed into a shape like eyeglasses. Specifically, the display device 100 further includes a housing 90 that holds the right-eye optical system 10a and the left-eye optical system 10b. The display device 100 is mounted onto the head of the observer by the housing 90.

The display device 100 includes, as the housing 90, a frame 91, a temple 92a provided on the right side of the frame 91 and anchored to the right ear of the observer, and a temple 92b provided on the left side of the frame 91 and anchored to the left ear of the observer. The frame 91 includes an accommodation space 91s on both sides, and each component of an imaging light projection device or the like constituting the optical system 10 described below is accommodated in the accommodation spaces 91s. The temples 92a, 92b are foldably coupled to the frame 91 by a hinge 95.

The right-eye optical system 10a and the left-eye optical system 10b have the same basic configuration. Therefore, the right-eye optical system 10a and the left-eye optical system 10b will be described as the optical system 10 without distinction in the description below.

Further, in the display device 100 illustrated in FIG. 1, imaging light L0 is made to travel in the left-right direction along the X axis.

A basic configuration of the optical system 10 of the display device 100 will now be described with reference to FIG. 2. FIG. 2 illustrates light L1 (solid line) of a specific wavelength of the imaging light L0 as well as light L2 (dot-and-dash line) on a long wavelength side and light L3 (dotted line) on a short wavelength side relative to the specific wavelength.

As illustrated in FIG. 2, in the optical system 10, a first optical portion L10 having a positive power, a mirror 40, a second optical portion L20 having a positive power, a third optical portion L30 having a positive power, and a fourth optical portion L40 having a positive power are disposed in a travel direction of the imaging light L0 emitted from an imaging light generation device 31.

In the present exemplary embodiment, the first optical portion L10 having a positive power is constituted by a projection optical system 32. The second optical portion L20 having a positive power is constituted by a first diffraction element 50 of a reflection type. The third optical portion L30 having a positive power is constituted by a light guide system 60. The fourth optical portion L40 having a positive power is constituted by a second diffraction element 70 of a reflection type. In the present exemplary embodiment, the first diffraction element 50 and the second diffraction element 70 are reflection-type diffraction elements.

The mirror 40 includes a reflection surface 400 that is a recessed curved surface, and has a positive power. When the reflection surface 400 of the mirror 40 has a positive power, the mirror 40 may be included in a component of the projection optical system 32. That is, when the mirror 40 has a positive power, the first optical portion L10 may include the mirror 40. The reflection surface 400 of the mirror 40 may be configured to have a flat surface and be without a power.

In such an optical system 10, with regard to the travel direction of the imaging light L0, the imaging light generation device 30 emits the imaging light L0 toward the projection optical system 32, and the projection optical system 32 emits the imaging light L0 incident thereon toward the mirror 40. The mirror 40 reflects the imaging light L0 incident thereon toward the first diffraction element 50, and the first diffraction element 50 emits the imaging light L0 incident thereon toward the light guide system 60. The light guide system 60 emits the imaging light L0 incident thereon to the second diffraction element 70, and the second diffraction element 70 emits the imaging light L0 incident thereon toward an eye E of the observer.

In the present exemplary embodiment, the imaging light generation device 31 generates the imaging light L0.

An aspect may be adopted where the imaging light generation device 31 includes a display panel 310 such as an organic electroluminescent display element. According to such an aspect, the display device 100 having a small size and capable of displaying a high-quality image can be provided. Further, another aspect may be adopted where the imaging light generation device 31 includes an illumination light source (not illustrated) and a display panel 310 such as a liquid crystal display element that modulates illumination light emitted from the illumination light source. According to such an aspect, the illumination light source is selectable, resulting in the advantage of an increased degree of flexibility in a wavelength characteristic of the imaging light L0. Herein, an aspect may be adopted where the imaging light generation device 31 includes one display panel 310 capable of color display. Another aspect may be adopted where the imaging light generation device 31 includes a plurality of the display panels 310 corresponding to respective colors and a synthesis optical system that synthesizes imaging light of respective colors emitted from the plurality of display panels 310. Furthermore, an aspect may be adopted where the imaging light generation device 31 modulates laser light by a micromirror device.

The projection optical system 32 is an optical system configured to project the imaging light L0 generated by the imaging light generation device 31, and is constituted by a plurality of lenses 321. In FIG. 2, an example is given of a case in which three lenses 321 are provided in the projection optical system 32. The number of lenses 321, however, is not limited thereto, and the projection optical system 32 may include four or more lenses 321. Further, each of the lenses 321 may be bonded to form a projection optical system 32. Additionally, the lens 321 may be constituted by a free form lens.

The light guide system 60 includes a lens system 61 on which the imaging light L0 emitted from the second diffraction element 50 is incident, and a mirror 62 that emits the imaging light L0 emitted from the lens system 61 in an obliquely inclined direction. The lens system 61 includes a plurality of lenses 611 disposed in the front-back direction along the Z axis. The mirror 62 includes a reflection surface 620 obliquely inclined in the front-back direction. In the present exemplary embodiment, the mirror 62 is a total reflection mirror. However, the mirror 62 may be a half mirror and, in this case, the range in which the external light is visible can be widened.

Next, the configuration of the first diffraction element 50 and the second diffraction element 70 will be described.

In the present exemplary embodiment, the first diffraction element 50 and the second diffraction element 70 have the same basic configuration. Hereinafter, the configuration of the second diffraction element 70 will be described as an example.

Figure 3A:
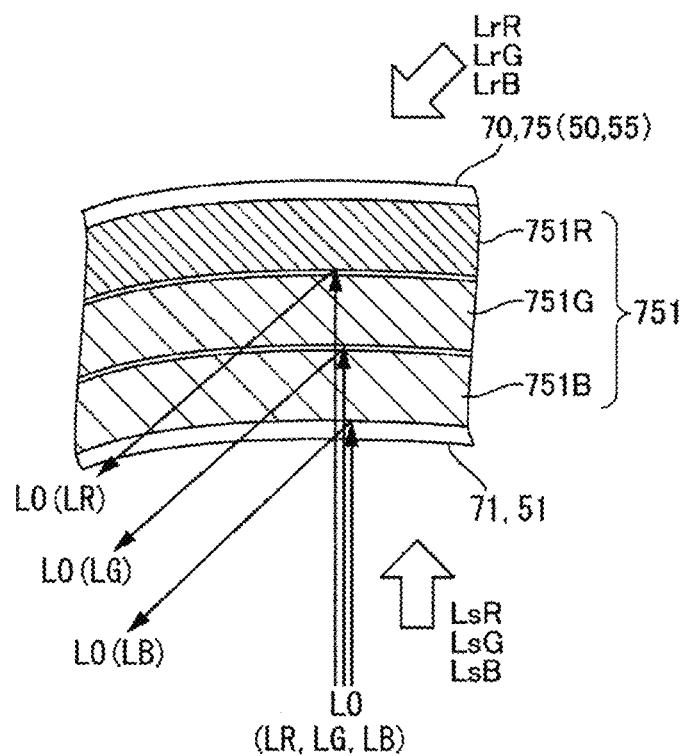
FIG. 3A is an explanatory view of interference fringes of a diffraction element.

FIG. 3A is an explanatory view of an interference fringe 751 of the second diffraction element 70 illustrated in FIG. 2. As illustrated in FIG. 3A, the second diffraction element 70 includes a reflection-type volume holographic element 75 that is a partial reflection-type diffraction optical element. Thus, the second diffraction element 70 forms a partial transmissive reflective combiner. Therefore, external light is also incident on the eye E via the second diffraction element 70, and thus the observer can recognize an image in which the imaging light L0 formed by the imaging light generation device 31 and the external light (background) are superimposed on each other.

The second diffraction element 70 faces the eye E of the observer. An incident surface 71 of the second diffraction element 70 on which the imaging light L0 is incident is a recessed curved surface recessed in a direction away from the eye E. In other words, the incident surface 71 has a shape with a central portion recessed and curved relative to a peripheral portion in an incident direction of the imaging light L0. Thus, the imaging light L0 can be efficiently converged toward the eye E of the observer.

The second diffraction element 70 includes the interference fringe 751 having a pitch corresponding to a specific wavelength. The interference fringe 751 is recorded as a difference in refractive index and the like in a hologram photosensitive layer. The interference fringe 751 is inclined in one direction relative to the incident surface 71 of the second diffraction element 70 so as to correspond to a specific incident angle. Therefore, the second diffraction element 70 diffracts and then deflects the imaging light L0 in a predetermined direction. The specific wavelength and the specific incident angle respectively correspond to a wavelength and an incident angle of the imaging light L0. The interference fringe 751 having such a configuration can be formed by performing interference exposure on the holographic photosensitive layer by using reference light Lr and object light Ls.

In the present exemplary embodiment, the imaging light L0 is for color display. Thus, the second diffraction element 70 includes interference fringes 751R, 761G, 751B formed at pitches corresponding to specific wavelengths. For example, the interference fringe 751R is formed at a pitch corresponding to a red light LR having a wavelength of 615 nm, for example, in a wavelength range from 580 nm to 700 nm. The interference fringe 751G is formed at a pitch corresponding to green light LG having a wavelength of 535 nm, for example, in a wavelength range from 500 nm to 580 nm. The interference pattern 751B is formed at a pitch corresponding to a blue light LB having a wavelength of 460 nm, for example, in a wavelength range from 400 nm to 500 nm. Such a configuration can be formed by forming a holographic photosensitive layer having sensitivity corresponding to the respective wavelengths, and performing interference exposure on the holographic photosensitive layer by using reference light LrR, LrG, LrB and object light LsR, LsG, LsB having the respective wavelengths.

Figure 3B:
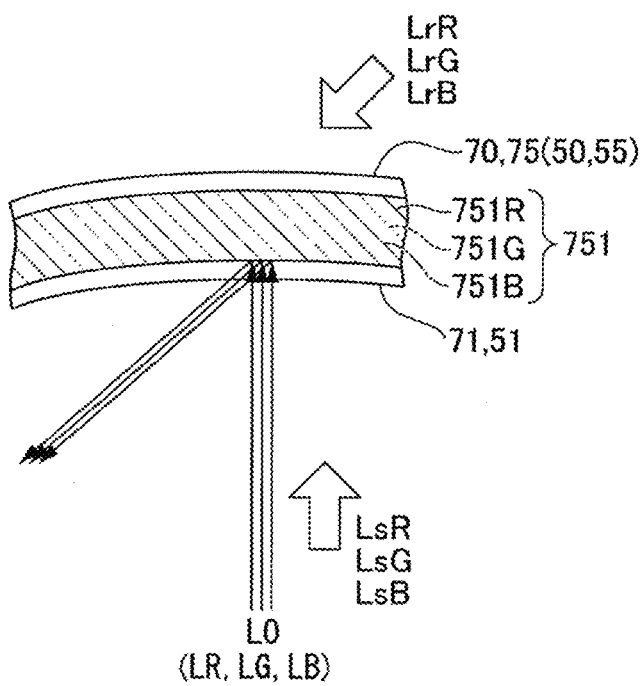
FIG. 3B is an explanatory view of a different mode of interference fringes of the diffraction element.

Note that the interference fringe 751 in which the interference fringes 751R, 751G, 751B are superimposed on each other may be formed in one layer as illustrated in FIG. 3B by dispersing a photosensitive material having sensitivity corresponding to the respective wavelengths in the holographic photosensitive layer and then performing interference exposure on the holographic photosensitive layer by using the reference light LrR, LrG, LrB and the object light LsR, LsG, LsB having the respective wavelengths. Further, light having a spherical wave may be used as the reference light LrR, LrG, LrB and the object light LsR, LsG, LsB.

The first diffraction element 50 having the same basic configuration as the second diffraction element 70 is provided with a reflection-type volume holographic element 55. An incident surface 51 of the first diffraction element 50 on which the imaging light L0 is incident has a recessed curved surface. In other words, the incident surface 51 has a shape with a central portion recessed and curved relative to a peripheral portion in the incident direction of the imaging light L0. Thus, the imaging light L0 can be efficiently deflected toward the light guide system 60.

Figure 4:
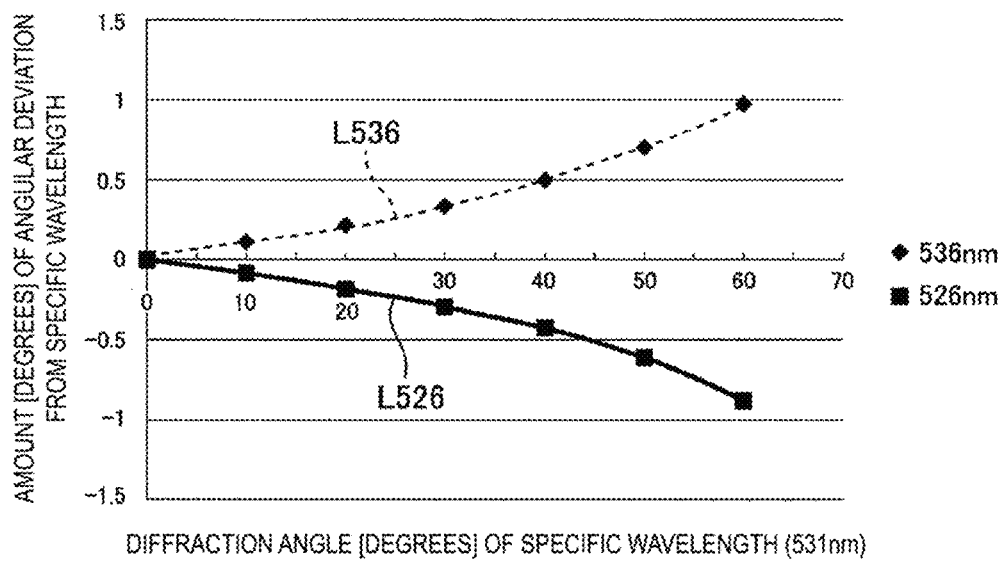
FIG. 4 is an explanatory chart showing diffraction characteristics of a first diffraction element and a second diffraction element.

FIG. 4 is an explanatory chart showing diffraction characteristics of the first diffraction element 50 and the second diffraction element 70. FIG. 4 shows the difference in diffraction angle between the specific wavelength and peripheral wavelengths when light beams are incident on a single point on the volume hologram. In FIG. 4, when the specific wavelength is 531 nm, the deviation in the diffraction angle of light of a peripheral wavelength having a wavelength of 526 nm is indicated by a solid line L526, and the deviation in the diffraction angle of light of a peripheral wavelength having a wavelength of 536 nm is indicated by a dashed line L536.

As illustrated in FIG. 4, even when light beams are incident on the same interference fringe recorded in the hologram, diffraction increases for light beams with longer wavelengths, and becomes less likely for light beams with shorter wavelengths. Thus, when two diffraction elements, namely, the first diffraction element 50 and the second diffraction element 70, are used as in the present exemplary embodiment, wavelength compensation cannot be properly made when the light is not caused to be incident taking into consideration the light beam angles of light having a long wavelength and light having a short wavelength relative to the specific wavelength. That is, color aberration generated by the second diffraction element 70 cannot be canceled. In addition, because the diffraction angle varies depending on the number of interference fringes, the interference fringe need to be considered.

Incidentally, as illustrated in FIG. 3A and FIG. 3B, the first diffraction element 50 and the second diffraction element 70 are constituted by holographic elements formed by two-luminous flux interference exposure. The holographic elements thus formed by two-luminous flux interference exposure have, in the plane on which the interference fringe is formed, a strong diffraction force and a strong deflection force that bends the light. Note that the plane on which the interference fringe is formed corresponds to a plane along the surface of the paper in FIG. 3A and FIG. 3B. In the description below, the plane on which the interference fringe is formed is referred to as a primary diffraction plane. In the optical system 10 illustrated in FIG. 2, the imaging light L0 is greatly deflected along a plane parallel to the XZ plane, thereby guiding the eye E of the observer. In the optical system 10 of the present exemplary embodiment, the primary diffraction is defined by a plane parallel to the XZ plane illustrated in FIG. 2.

On the other hand, the holographic elements formed by two-luminous flux interference exposure have, in a plane orthogonal to the primary diffraction plane, a weak diffraction force and a weak deflection force that bends the light. Here, the plane orthogonal to the primary diffraction plane corresponds to a plane orthogonal to the surface of the paper in FIG. 3A and FIG. 3B and, in the following description, this plane is referred to as a secondary diffraction plane. In the optical system 10 of the present exemplary embodiment, the secondary diffraction plane is a plane orthogonal to the XZ plane illustrated in FIG. 2, that is, orthogonal to the paper surface of FIG. 2.

That is, in the first diffraction element 50 and the second diffraction element 70 formed by two-luminous flux interference exposure, the diffraction angle in the secondary diffraction plane is small compared to the diffraction angle in the primary diffraction plane. As described using FIG. 4, the smaller the diffraction angle, the smaller the deviation of the diffraction angle of the peripheral wavelength from the specific wavelength. Note that, although diffraction of light occurs even in a plane that exists between the primary diffraction plane and the secondary diffraction plane, the primary diffraction plane that produces the largest diffraction angle and the secondary diffraction plane that produces the smallest diffraction angle are considered in the present disclosure.

Here, a case is considered in which the first diffraction element 50 and the second diffraction element 70 are designed without taking into consideration the difference in diffraction angle that occurs between the primary diffraction plane and the secondary diffraction plane. In this case, the first optical portion L10, the second optical portion L20, the third optical portion L30, and the fourth optical portion L40 are designed to have similar powers for both the primary diffraction plane and the secondary diffraction plane.

As described above, because the difference in diffraction angle of peripheral wavelengths occurring in the secondary diffraction plane is small, the power of each optical portion required to compensate for the difference in diffraction angle occurring in the primary diffraction plane is higher than the power of each optical portion required to compensate for the difference in diffraction angle occurring in the secondary diffraction plane.

Therefore, when each optical portion is designed without taking into consideration the difference in diffraction angle that occurs between the primary diffraction plane and the secondary diffraction plane, the power in the primary diffraction plane is excessive in each of the optical portions. Thus, the problem arises that assembly tolerances become more severe than necessary.

The present inventors conceived that, because the difference in diffraction angle of a peripheral wavelength that occurs in the secondary diffraction plane is small, the angular deviation of imaging light caused by a difference in diffraction angle can be generally corrected by dispersion produced by the lens. The configuration of the optical system 10 of the present exemplary embodiment was then discovered.

In the optical system 10 of the present exemplary embodiment, in the optical path of the imaging light L0, the deflection force in the primary diffraction plane of the imaging light L0 is greater than the deflection force in the secondary diffraction plane. The deflection force of the imaging light L0 is dependent on the power of the first optical portion L10, the second optical portion L20, the third optical portion L30, and the fourth optical portion L40. That is, in the optical system 10 of the present exemplary embodiment, the power in the secondary diffraction plane is smaller than the power in the primary diffraction plane in the first optical portion L10, the second optical portion L20, the third optical portion L30, and the fourth optical portion L40.

In the optical system 10 illustrated in FIG. 2, in at least the XZ plane serving as the primary diffraction plane illustrated in FIG. 2, the direction of incidence on the second diffraction element 70 is made appropriate in accordance with whether the sum of the number of reflections of light of the mirror 62 and the number of times of intermediate image formation between the first diffraction element 50 and the second diffraction element 70 is an odd number or an even number, as set forth in JP-A-2017-167181. Therefore, wavelength compensation of the imaging light, that is, chromatic aberration, can be canceled at least in the plane along the primary diffraction plane.

Specifically, the imaging light L0 incident on the first diffraction element 50 is diffracted and deflected by the first diffraction element 50 in the primary diffraction plane, as illustrated in FIG. 2. At this time, a diffraction angle $\theta_2$ of the light L2 on the long wavelength side relative to the specific wavelength is larger than a diffraction angle $\theta_1$ of the light L1 of the specific wavelength. Further, a diffraction angle $\theta_3$ of the light L3 on the short wavelength side relative to the specific wavelength is smaller than the diffraction angle $\theta_1$ of the light L1 of the specific wavelength. Accordingly, the imaging light L0 emitted from the first diffraction element 50 is deflected and dispersed at each wavelength.

The imaging light L0 emitted from the first diffraction element 50 is incident on the second diffraction element 70 via the light guide system 60, and is then diffracted and deflected by the second diffraction element 70. At this time, in the optical path from the first diffraction element 50 to the second diffraction element 70, an intermediate image is formed once, and reflection by the mirror 62 is performed once. Therefore, given that an angle between the imaging light L0 and a normal line of the incident surface of the second diffraction element 70 is an incident angle, the light L2 on the long wavelength side relative to the specific wavelength has an incident angle $\theta_{12}$ larger than an incident angle $\theta_{11}$ of the light L1 of the specific wavelength while the light L3 on the short wavelength side relative to the specific wavelength has an incident angle $\theta_{13}$ smaller than the incident angle $\theta_{11}$ of the light L1 of the specific wavelength. Further, the light L2 on the long wavelength side relative to the specific wavelength has a diffraction angle $\theta_2$ larger than the diffraction angle $\theta_1$ of the light L1 of the specific wavelength, and the light L3 on the short wavelength side with respect to the specific wavelength has a diffraction angle $\theta_3$ smaller than a diffraction angle $\theta_1$ of the light L1 of the specific wavelength.

Therefore, the light L2 on the long wavelength side relative to the specific wavelength is incident on the first diffraction element 50 at an incident angle larger than an incident angle of the light L1 of the specific wavelength. However, the light L2 on the long wavelength side relative to the specific wavelength has a diffraction angle larger than the diffraction angle of the light L1 of the specific wavelength. As a result, the light L2 on the long wavelength side relative to the specific wavelength and the light L1 of the specific wavelength are substantially parallel light when emitted from the second diffraction element 70. In contrast, the light L3 on the short wavelength side relative to the specific wavelength is incident on the first diffraction element 50 at an incident angle smaller than an incident angle of the light L1 of the specific wavelength. However, the light L3 on the short wavelength side relative to the specific wavelength has a diffraction angle smaller than the diffraction angle of the light L1 of the specific wavelength. As a result, the light L3 on the short wavelength side with respect to the specific wavelength and the light L1 of the specific wavelength are substantially parallel light when emitted from the second diffraction element 70. Accordingly, as illustrated in FIG. 2, because the imaging light L0 emitted from the second diffraction element 70 is incident as substantially parallel light on the eye E of the observer, positional deviation of image formation in a retina EO at each wavelength can be suppressed. Accordingly, chromatic aberration of the imaging light L0 generated by the second diffraction element 70 can be canceled in the primary diffraction plane illustrated in FIG. 2.

Next, the conjugate relationship between the first diffraction element 50 and the second diffraction element 70 will be described. In the optical system 10 of the present exemplary embodiment, the first diffraction element 50 and the second diffraction element 70 have the conjugate relationship described below in at least the primary diffraction plane illustrated in FIG. 2.

Figure 5A:
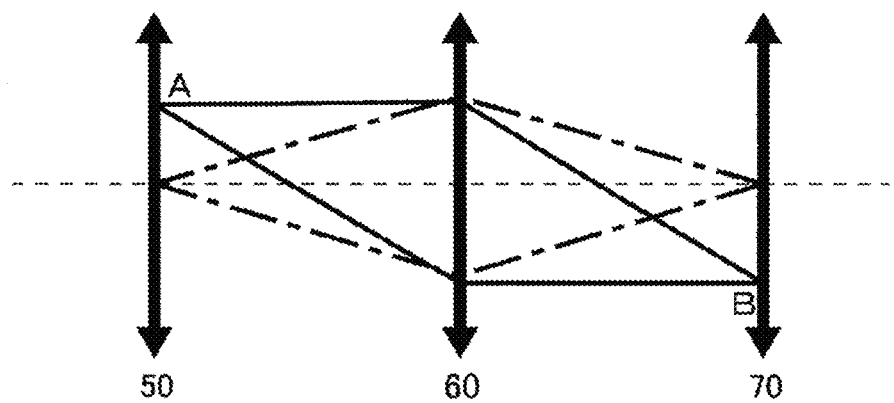
FIG. 5A is an explanatory view of a case in which the first diffraction element and the second diffraction element have a conjugate relationship.
Figure 5B:
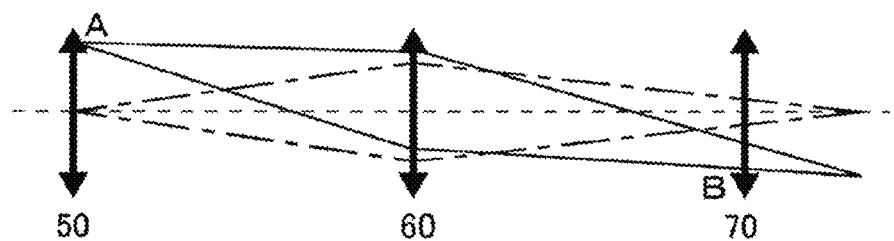
FIG. 5B is an explanatory view of a case in which the first diffraction element and the second diffraction element do not have a conjugate relationship.
Figure 5C:
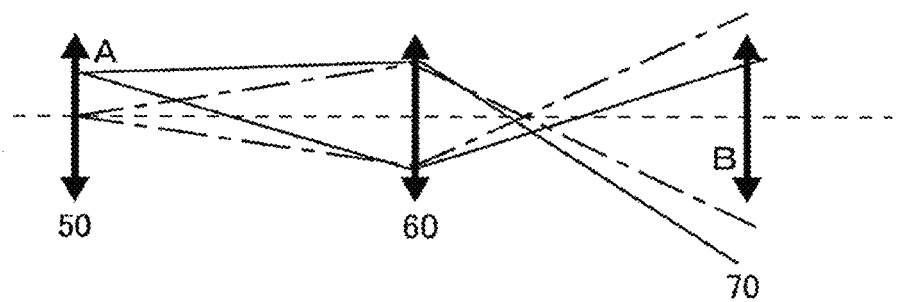
FIG. 5C is an explanatory view of a case in which the first diffraction element and the second diffraction element do not have a conjugate relationship.
Figure 6A:
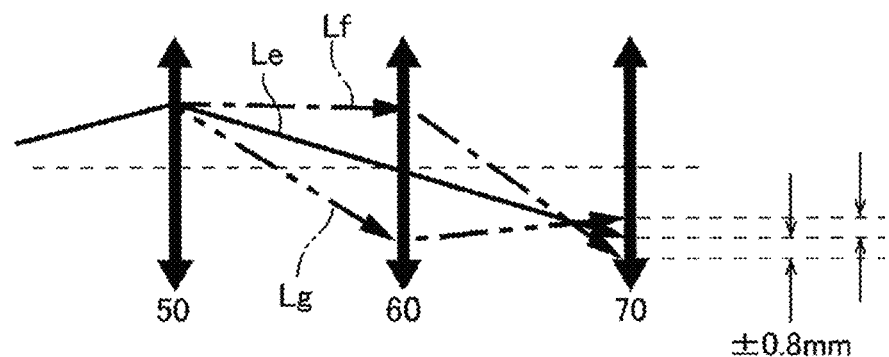
FIG. 6A is an explanatory view illustrating a tolerance of deviation from the conjugate relationship between the first diffraction element and the second diffraction element.
Figure 6B:
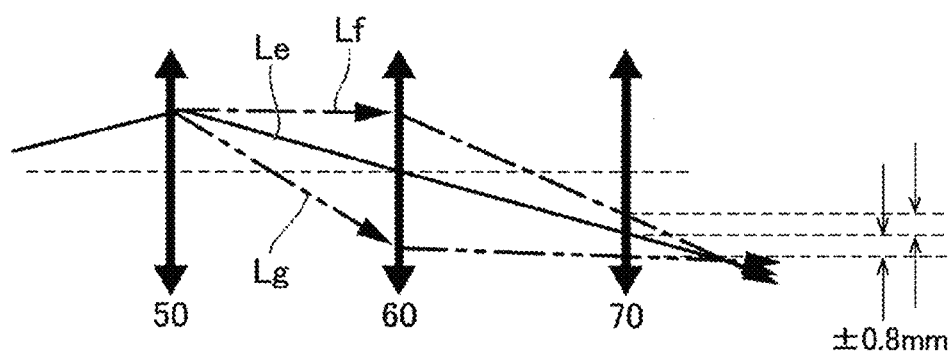
FIG. 6B is an explanatory view of another mode illustrating a tolerance of deviation from the conjugate relationship.

FIG. 5A is an explanatory view of a case in which the first diffraction element 50 and the second diffraction element 70 have a conjugate relationship. FIG. 5B and FIG. 5C are explanatory views of a case in which the first diffraction element 50 and the second diffraction element 70 do not have a conjugate relationship. FIG. 6A and FIG. 6B are explanatory views illustrating a tolerance of deviation from a conjugate relationship between the first diffraction element 50 and the second diffraction element 70 illustrated in FIG. 5B and FIG. 5C. In FIG. 6A and FIG. 6B, light of the specific wavelength is indicated by a solid line Le, light of a wavelength equivalent to the specific wavelength−10 nm is indicated by a dot-dash line Lf, and light of a wavelength equivalent to the specific wavelength+10 nm is indicated by a two-dot chain line Lg. Note that, in FIGS. 5A to 5C, 6A, and 6B, to ensure ease of understanding of the travel of light, the first diffraction element 50, the second diffraction element 70, and the light guide system 60 are illustrated as transmissive types, and the first diffraction element 50, the second diffraction element 70, and the light guide system 60 are indicated by arrows.

As illustrated in FIG. 5A, when the first diffraction element 50 and the second diffraction element 70 are configured to have a conjugate relationship, diverging light emitted from point A of the first diffraction element 50 is converged by the light guide system 60 having a positive power, and incident on point B of the second diffraction element 70. Therefore, compensation for chromatic aberration due to diffraction generated at point B can be made at point A.

In contrast, as illustrated in FIG. 5B and FIG. 5C, when the first diffraction element 50 and the second diffraction element 70 do not have a conjugate relationship, diverging light emitted from point A of the first diffraction element 50 is converged by the light guide system 60 having a positive power at the center, but intersects and is incident at a position away from or close to the point B on the second diffraction element 70. Therefore, point A and point B do not have a one-to-one relationship. Here, because the compensation effect becomes more enhanced when the interference fringes in the region are uniform, when the first diffraction element 50 and the second diffraction element 70 are not in a conjugate relationship, the compensation effect weakens.

On the other hand, it is difficult to provide compensation for the entire projection region with the second diffraction element 70. Therefore, for the modes illustrated in FIG. 5B and FIG. 5C, sufficient wavelength compensation cannot be performed, and thus degradation of resolution occurs.

Note that, while there exists in light having a wavelength of ±10 nm relative to the specific wavelength an error of about ±0.4 mm from point B where light of the specific wavelength reaches, the reduction in resolution is not noticeable. As a result of studies conducted on such a tolerance range, it was found that when light of the specific wavelength intersects in front of point B and is incident within a range of ±0.8 mm on an ideal second diffraction element 70 where light of the specific wavelength reaches as illustrated in FIG. 6A, the reduction in resolution is not noticeable. Further, as illustrated in FIG. 6B, when light of the specific wavelength intersects behind point B and is incident within a range of ±0.8 mm on the ideal second diffraction element 70 where light of the specific wavelength reaches, the reduction in resolution is not noticeable. Therefore, even when the first diffraction element 50 and the second diffraction element 70 have a substantially conjugate rather than a fully conjugate relationship and the light reaches within ±0.8 mm from the ideal point B, the reduction in resolution is permissible. That is, in the present exemplary embodiment, the first diffraction element 50 and the second diffraction element 70 having a conjugate relationship means that the incident position of light of the specific wavelength falls within an error range of ±0.8 mm from the ideal incident point.

Figure 7A:
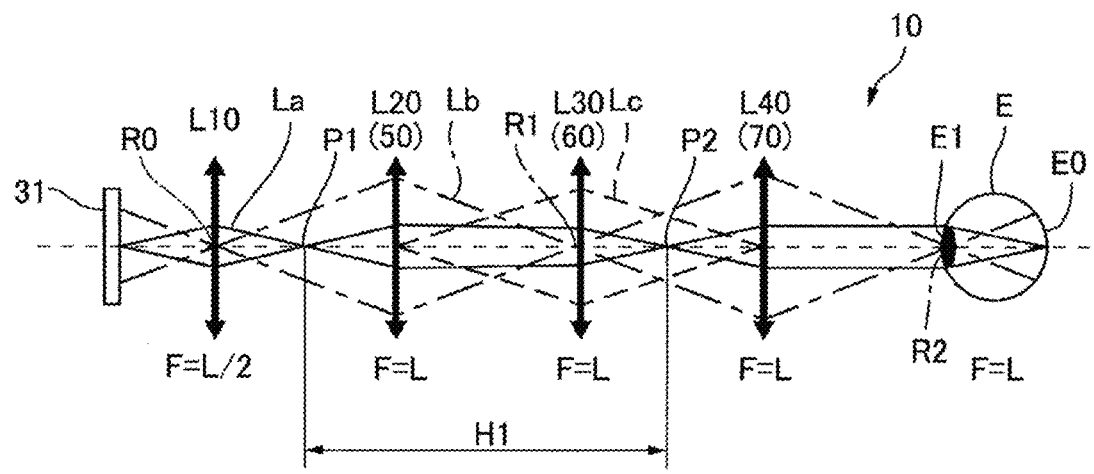
FIG. 7A is a light beam diagram of a primary diffraction plane of the optical system.
Figure 7B:
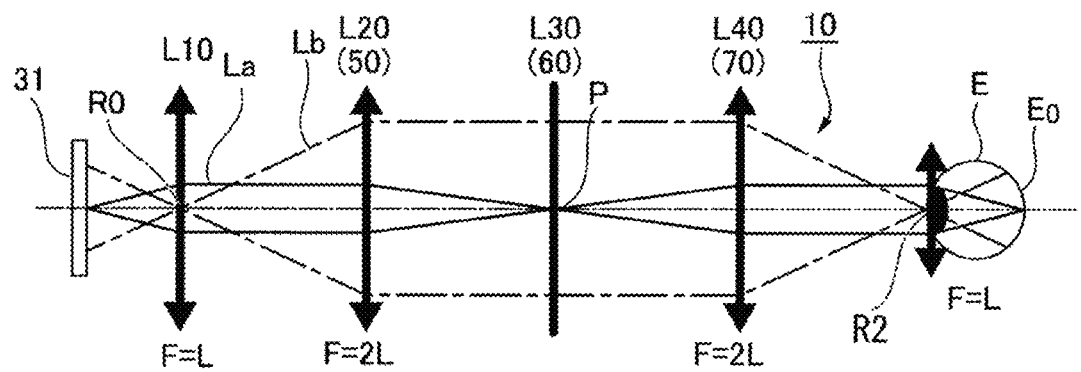
FIG. 7B is a light beam diagram of a secondary diffraction plane of the optical system.

FIG. 7A is a light beam diagram of the primary diffraction plane of the optical system 10. FIG. 7B is a light beam diagram of the secondary diffraction plane of the optical system 10. In FIG. 7A, FIG. 7B, and drawings referenced hereinafter, each optical portion disposed along the optical axis is indicated by a bold arrow. Note that when an optical portion disposed along the optical axis is indicated by a bold line only and not an arrow, the optical portion is regarded as not having power.

Further, a light beam emitted from one pixel of the imaging light generation device 31 is indicated by the solid line La, the main light beam emitted from an end portion of the imaging light generation device 31 is indicated by the dot-dash line Lb, and a position of the conjugate relationship with the first diffraction element 50 is indicated by the long dashed line Lc. Here, "intermediate image" refers to a location where light beams (solid lines La) emitted from one pixel converge, and "pupil" refers to a location where the main light beams (dot-dash line Lb) of each image angle converge. Further, FIG. 7A and FIG. 7B illustrate the travel of light emitted from the imaging light generation device 31. Note that, in FIG. 7A and FIG. 7B, to simplify the drawings, all optical portions are illustrated as transmissive types.

As illustrated in FIG. 7A, in the primary diffraction plane of the optical system 10, a focal length F of the first optical portion L10 is L/2, and the focal lengths F of the second optical portion L20, the third optical portion L30, and the fourth optical portion L40 are all L.

On the other hand, as illustrated in FIG. 7B, in the secondary diffraction plane of the optical system 10, the focal length F of the first optical portion L10 is L, and the focal lengths F of the second optical portion L20, the third optical portion L30, and the fourth optical portion L40 are all 2L. The optical system 10 includes the third optical portion L30 indicated by a bold line in the secondary diffraction plane. That is, in the secondary diffraction plane, the third optical portion L30 does not have power for forming an intermediate image or a pupil compared to the primary diffraction plane. Here, "the third optical portion L30 does not have power" means that the lens constituting the third optical portion L30 has a plate shape without a lens surface in the secondary diffraction plane.

Further, in the optical system 10 of the present exemplary embodiment, when the primary diffraction plane and the secondary diffraction plane are compared, the focal length F of the first optical portion L10, the second optical portion L20, and the fourth optical portion L40 in the secondary diffraction plane is long. Thus, according to the optical system 10 of the present exemplary embodiment, in the secondary diffraction plane, the focal length F of the third optical portion L30 is lengthened and power is eliminated, making the power in the secondary diffraction plane smaller than the power in the primary diffraction plane. In this way, in the optical system 10 of the present exemplary embodiment, the deflection force in the primary diffraction plane of the imaging light is greater than the deflection force in the secondary diffraction plane.

Figure 8:
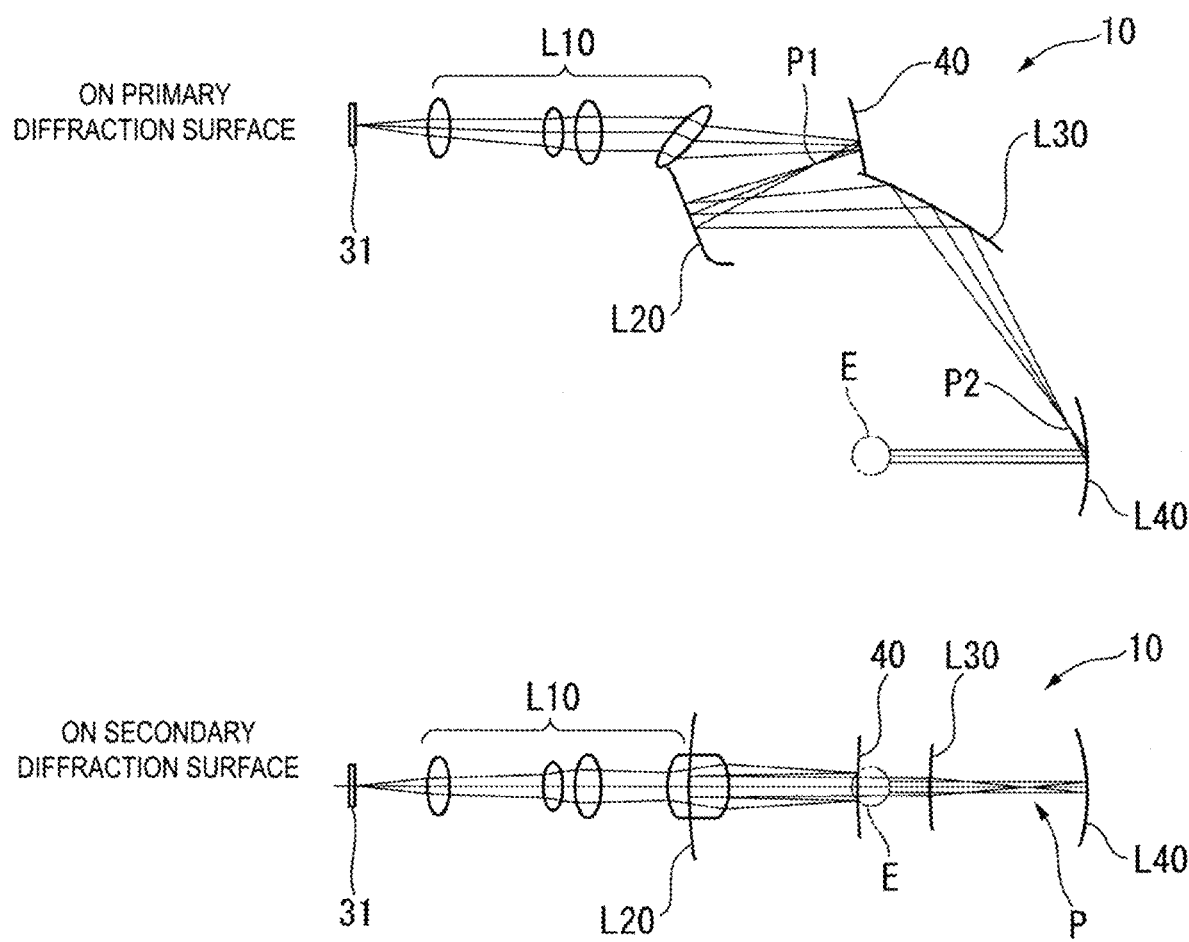
FIG. 8 is a diagram illustrating a state of an intermediate image of imaging light formed in the optical system.

FIG. 8 is a diagram illustrating a state of an intermediate image of imaging light formed in the optical system 10. FIG. 8 illustrates an intermediate image formed in the primary diffraction plane and an intermediate image formed in the secondary diffraction plane, calculated by a simulation using a model corresponding to the optical system 10 of the present exemplary embodiment.

As illustrated in FIG. 7A and FIG. 8, in the primary diffraction plane of the optical system 10 of the present exemplary embodiment, a first intermediate image P1 of imaging light is formed between the first optical portion L10 and the third optical portion L30, and a second intermediate image P2 of imaging light is formed between the third optical portion L30 and the fourth optical portion L40. That is, in the optical system 10 of the present exemplary embodiment, the number of intermediate images formed on the primary diffraction plane is two.

On the other hand, as illustrated in FIG. 7B and FIG. 8, in the secondary diffraction plane of the optical system 10 of the present exemplary embodiment, an intermediate image P of imaging light is formed between the second optical portion L20 and the fourth optical portion L40. That is, in the optical system 10 of the present exemplary embodiment, the number of intermediate images formed on the secondary diffraction plane is one. Therefore, in the optical system 10 of the present exemplary embodiment, the number of intermediate images of imaging light formed on the primary diffraction plane is greater than the number of intermediate images of imaging light formed on the secondary diffraction plane.

Further, the imaging light from one point of the imaging light generation device 31 is deflected by the first diffraction element 50, and light of peripheral wavelengths deviated from the specific wavelength is made incident within a predetermined range of the second diffraction element 70 by the third optical portion L30. That is, the first diffraction element 50 and the second diffraction element 70 are in a conjugate or substantially conjugate relationship. Here, the absolute value of the magnification of the projection on the second diffraction element 70 by the third optical portion L30 of the first diffraction element 50 is from 0.5 times to 10 times, and such an absolute value of magnification is preferably from 1 to 5.

Figure 9:
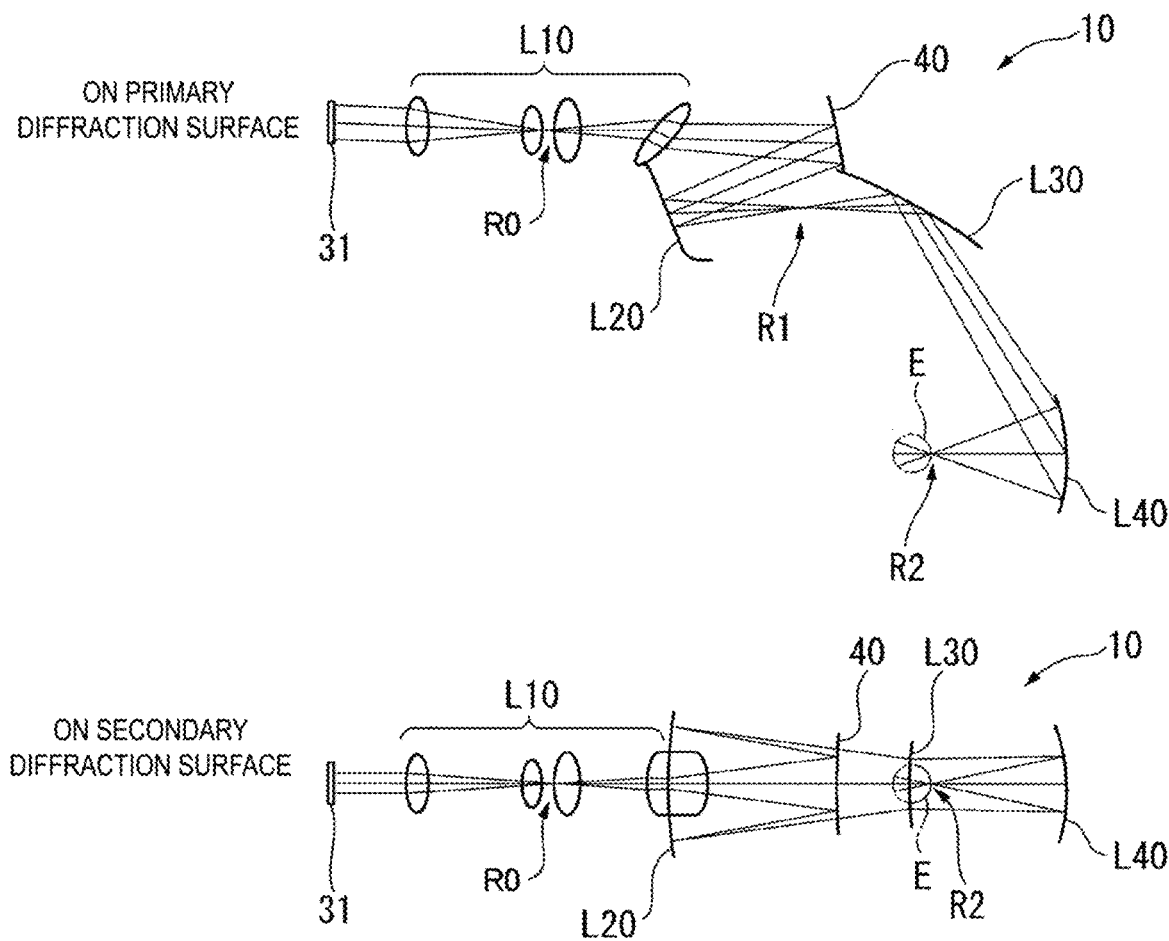
FIG. 9 is a diagram illustrating a relationship between pupils in the optical system.

FIG. 9 is a diagram illustrating a relationship between pupils in the optical system 10 of the present exemplary embodiment. FIG. 9 illustrates a pupil in the primary diffraction plane and a pupil in the secondary diffraction plane, calculated by a simulation using a model corresponding to the optical system 10 of the present exemplary embodiment.

As illustrated in FIG. 7A and FIG. 9, in the primary diffraction plane of the optical system 10 of the present exemplary embodiment, a pupil R0 is formed in the first optical portion L10, a pupil R1 is formed between the second optical portion L20 and the fourth optical portion L40, and the fourth optical portion 40 collimates the imaging light to form an exit pupil R2. The pupil R1 is formed between the second optical portion L20 and the fourth optical portion L40 in the vicinity of the third optical portion L30. "In the vicinity of the third optical portion L30" refers to a position between the second optical portion L20 and the third optical portion L30 that is closer to the third optical portion L30 than the second optical portion L20, or to a position between the third optical portion L30 and the fourth optical portion L40 that is closer to the third optical portion L30 than the fourth optical portion L40. That is, in the optical system 10 of the present exemplary embodiment, the number of pupils formed in the primary diffraction plane is two.

On the other hand, as illustrated in FIG. 7B and FIG. 9, in the secondary diffraction plane of the optical system 10 of the present exemplary embodiment, a pupil R0 is formed in the first optical portion L10, and the fourth optical portion L40 collimates the imaging light to form an exit pupil R2 only. That is, in the optical system 10 of the present exemplary embodiment, the number of pupils formed in the secondary diffraction plane is one. Therefore, in the optical system 10 of the present exemplary embodiment, the number of pupils formed on the primary diffraction plane is greater than the number of pupils formed on the secondary diffraction plane.

Therefore, according to the optical system 10 of the present exemplary embodiment, in the primary diffraction plane, the first intermediate image P1 of imaging light is formed between the projection optical system 32 and the light guide system 60, the pupil R1 is formed in the vicinity of the light guide system 60, the second intermediate image P2 of imaging light is formed between the light guide system 60 and the second diffraction element 70, and the second diffraction element 70 collimates the imaging light to form the exit pupil R2.

In the optical system 10 of the present exemplary embodiment, the first intermediate image P1 is formed between the first optical portion L10 (projection optical system 32) and the second optical portion L20 (first diffraction element 50).

According to the optical system 10 of the present exemplary embodiment, four conditions (conditions 1, 2, 3, 4) described below are satisfied in the primary diffraction plane.

Condition 1: The light beams emitted from one point of the imaging light generation device 31 are formed as one point on the retina E0.

Condition 2: The incident pupil of the optical system and the pupil of the eye are conjugate.

Condition 3: The first diffraction element 50 and the second diffraction element 70 are appropriately disposed so as to compensate for peripheral wavelengths.

Condition 4: The first diffraction element 50 and the second diffraction element 70 are in a conjugate or substantially conjugate relationship.

More specifically, as understood from the dot-dash line Lb illustrated in FIG. 7A, condition 1 that the light beams emitted from one point of the imaging light generation device 31 are formed as one point on the retina E0 is satisfied, and thus the observer can visually recognize one pixel. Further, as understood from the solid line La illustrated in FIG. 7A, the condition 2 that the incident pupil of the optical system 10 and the pupil E1 of the eye E are conjugate (pupil conjugation) is satisfied, and thus the entire region of the image generated by the imaging light generation device 31 can be visually recognized. Further, the condition 3 that the first diffraction element 50 and the second diffraction element 70 are appropriately disposed so as to compensate for peripheral wavelengths is satisfied, and thus the color aberration generated by the second diffraction element 70 can be canceled by performing wavelength compensation. Further, as understood from the long dashed line Lc illustrated in FIG. 7A, condition 4 that the first diffraction element 50 and the second diffraction element 70 are in a conjugate or substantially conjugate relationship is satisfied, and thus, in the first diffraction element 50 and the second diffraction element 70, it is possible to make the light beams incident on a location where the interference fringes are the same and properly perform wavelength compensation. Thus, degradation of the resolution of the imaging light can be suppressed.

In the optical system 10 of the present exemplary embodiment, condition 1 and condition 2 of the four conditions described above are satisfied in the primary diffraction plane. More specifically, as understood from the dot-dash line Lb illustrated in FIG. 7B, condition 1 that the light beams emitted from one point of the imaging light generation device 31 are formed as one point on the retina E0 is satisfied, and thus the observer can visually recognize one pixel. Further, as understood from the solid line La illustrated in FIG. 7B, the condition 2 that the incident pupil of the optical system 10 and the pupil E1 of the eye E are conjugate (pupil conjugation) is satisfied, and thus the entire region of the image generated by the imaging light generation device 31 can be visually recognized.

On the other hand, in the optical system 10 of the present exemplary embodiment, the deflection force in the secondary diffraction plane is reduced by the deflection force in the primary plane surface of the imaging light, and thus condition 3 and condition 4 described above are not satisfied in the secondary diffraction plane.

Here, as described above, the difference in diffraction angle of the peripheral wavelengths that occur in the secondary diffraction plane is small. Therefore, even when condition 3 and condition 4 are not satisfied in the secondary diffraction plane, the difference in diffraction angle of the specific wavelength generated upon deflection by the first diffraction element 50 is small, and thus the light deviated due to the diffraction angle difference can be corrected by the dispersion occurring in the lens of the optical portion and made incident within a predetermined range of the second diffraction element 70. Thus, even when the problem occurs that the light is incident at a location where the interference fringes are different, the impact can be minimized.

Accordingly, in the optical system 10 of the present exemplary embodiment, light of a peripheral wavelength of the specific wavelength can be generally incident in the vicinity of the light of the specific wavelength even in the secondary diffraction plane, and thus the occurrence of chromatic aberration can be generally canceled even when condition 3 and condition 4 are not satisfied. Thus, the optical system 10 of the present exemplary embodiment can suppress degradation of resolution even in the secondary diffraction plane. That is, according to the optical system 10 of the present exemplary embodiment, although the wavelength compensation effect is weak compared to that of the primary diffraction plane, a certain wavelength compensation effect can be obtained when the aperture ratio is small or when the light beam diameter (exit pupil diameter) incident on the eye of the observer is small.

Further, in the optical system 10 of the present exemplary embodiment, in the optical path of the imaging light, the deflection force in the primary diffraction plane of the imaging light L0 is greater than the deflection force in the secondary diffraction plane. Further, in the optical system 10 of the present exemplary embodiment, the number of intermediate images and pupils of the imaging light formed on the primary diffraction plane is greater than the number of intermediate images and pupils of the imaging light formed on the secondary diffraction plane.

That is, according to the optical system 10 of the present exemplary embodiment, in the first diffraction element 50 and the second diffraction element 70, the power of each optical portion is designed taking into consideration the difference in diffraction angle that occurs between the primary diffraction plane and the secondary diffraction plane. As a result, it is possible to keep the power of each optical portion in the secondary diffraction plane from being increased more than necessary.

Therefore, according to the optical system 10 of the present exemplary embodiment, the power of each of the optical portions is suppressed in the secondary diffraction plane, making it possible to alleviate assembly tolerances of optical components such as lenses constituting the optical portions.

Second Exemplary Embodiment

Next, a configuration of the optical system according to a second exemplary embodiment will be described.

The optical system of the present exemplary embodiment has the same power as the optical system 10 of the first exemplary embodiment in the primary diffraction plane, but has a power different from that of the optical system 10 of the first exemplary embodiment in the secondary diffraction plane. In the description below, components common to those of the first exemplary embodiment will be given identical reference numerals and detailed description thereof will be omitted.

Figure 10:
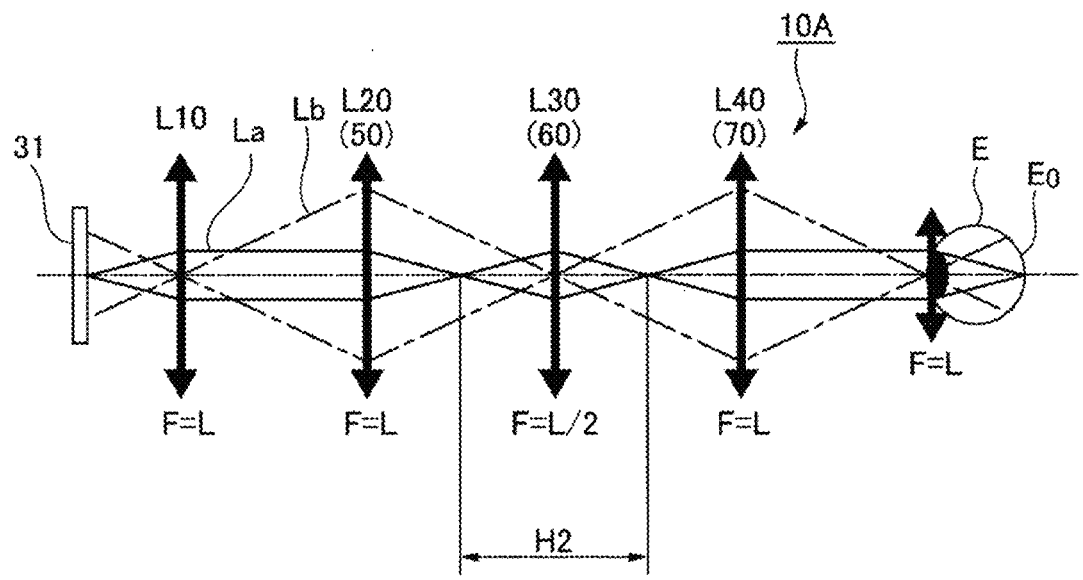
FIG. 10 is a light beam diagram of the secondary diffraction plane of the optical system according to a second exemplary embodiment.

FIG. 10 is a light beam diagram of the secondary diffraction plane of the optical system according to the present exemplary embodiment. Note that the light beam diagram of the secondary diffraction plane of the optical system according to the present exemplary embodiment is common to that in FIG. 7A, and therefore is omitted.

As illustrated in FIG. 10, in the secondary diffraction plane of an optical system 10A of the present exemplary embodiment, the focal length F of the first optical portion L10 is L, the focal lengths F of the second optical portion L20 and the fourth optical portion L40 are both L, and the focal length of the third optical portion L30 is L/2.

On the other hand, in the primary diffraction plane of the optical system 10A of the present exemplary embodiment, the focal length F of the first optical portion L10 is L/2, and the focal lengths F of the second optical portion L20, the third optical portion L30, and the fourth optical portion L40 are all L (refer to FIG. 7A).

In the optical system 10A of the present exemplary embodiment, when the primary diffraction plane and the secondary diffraction plane are compared, the focal length F of the first optical portion L10 in the secondary diffraction plane is long. That is, the optical system 10A of the present exemplary embodiment employs a configuration in which the power in the secondary diffraction plane of the first optical portion L10 is suppressed.

In this way, in the optical system 10A of the present exemplary embodiment, the power of the first optical portion L10 is suppressed to lengthen the focal length F in the secondary diffraction plane, thereby making the power in the secondary diffraction plane smaller than the power in the primary diffraction plane. Thus in the optical system 10A of the present exemplary embodiment, the deflection force in the primary diffraction plane of the imaging light is greater than the deflection force in the secondary diffraction plane.

In the optical system 10A of the present exemplary embodiment, in the primary diffraction plane as illustrated in FIG. 7A, the first intermediate image P1 of the imaging light is formed between the first optical portion L10 and the third optical portion L30, and the second intermediate image P2 of imaging light is formed between the third optical portion L30 and the fourth optical portion L40. More specifically, the first intermediate image P1 is formed between the first optical portion L10 and the second optical portion L20. Thus, a distance between the first intermediate image P1 and the second intermediate image P2 is defined by the reference numeral H1 illustrated in FIG. 7A.

On the other hand, in the optical system 10A of the present exemplary embodiment, in the secondary diffraction plane as illustrated in FIG. 8, the first intermediate image P1 of the imaging light is formed between the first optical portion L10 and the third optical portion L30, and the second intermediate image P2 of imaging light is formed between the third optical portion L30 and the fourth optical portion L40. More specifically, the first intermediate image P1 is formed between the first optical portion L10 and the second optical portion L20. Thus, a distance between the first intermediate image P1 and the second intermediate image P2 is defined by the reference numeral H2 illustrated in FIG. 8.

Therefore, in the optical system 10A of the present exemplary embodiment, when the light beam diagram of the primary diffraction plane and the light beam diagram of the secondary diffraction plane are compared, the first distance H1 between the first intermediate image P1 and the second intermediate image P2 formed on the primary diffraction plane is longer than the second distance H2 between the first intermediate image P1 and the second intermediate image P2 formed on the secondary diffraction plane.

In the optical system 10A of the present exemplary embodiment, a configuration is employed in which the first distance H1 is configured to be longer than the second distance H2, thereby making the deflection force in the secondary diffraction plane less than the deflection force in the primary diffraction plane of the imaging light.

According to the optical system 10A of the present exemplary embodiment, similar to the optical system 10 of the first exemplary embodiment, the power of each optical portion is designed taking into consideration the difference in diffraction angle that occurs between the primary diffraction plane and the secondary diffraction plane in the first diffraction element 50 and the second diffraction element 70. As a result, it is possible to keep the power of each optical portion in the secondary diffraction plane from being increased more than necessary. Therefore, in the optical system 10A of the present exemplary embodiment as well, the power of each of the optical portions is suppressed in the diffraction plane, making it possible to alleviate assembly tolerances of optical components such as lenses constituting the optical portions.

In the optical system 10A of the present exemplary embodiment as well, similar to the configuration of the first exemplary embodiment, the four conditions are satisfied in the primary diffraction plane. Thus, in the first diffraction element 50 and the second diffraction element 70, the light beams can be made incident at a location where the interference fringes are the same, and chromatic aberration can be canceled by properly performing wavelength compensation. Thus, degradation of the resolution of the imaging light can be suppressed.

In addition, while condition 3 and condition 4 described above are not satisfied in the secondary diffraction plane, the difference in the diffraction angle of the peripheral wavelengths that occurs in the secondary diffraction plane is small and thus, even in the optical system 10A of the present exemplary embodiment, the occurrence of chromatic aberration can be generally canceled by causing the light of the peripheral wavelengths of the specific wavelength to be generally incident in the vicinity of the light of the specific wavelength.

Third Exemplary Embodiment

Next, a configuration of the optical system according to a third exemplary embodiment will be described. The optical system of the present exemplary embodiment differs from that of the first exemplary embodiment in the configuration of the imaging light generation device. In the description below, components common to those of the first exemplary embodiment will be given identical reference numerals and detailed description thereof will be omitted.

Figure 11:
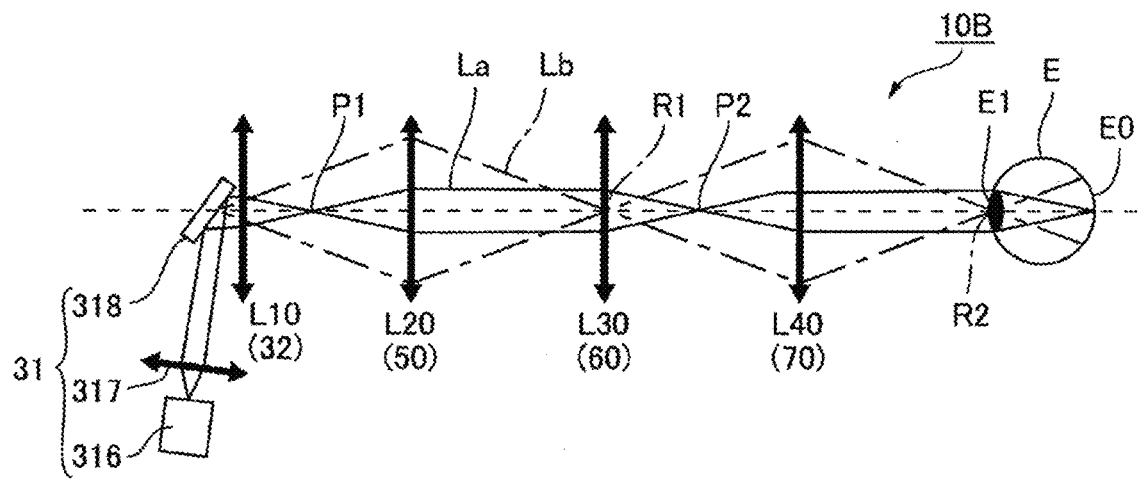
FIG. 11 is a light beam diagram of the optical system according to a third exemplary embodiment.

FIG. 11 is a light beam diagram of an optical system 10B according to the third exemplary embodiment. Note that FIG. 11 illustrates a configuration of an optical system of the primary diffraction plane. As illustrated in FIG. 11, the optical system 10B of the present exemplary embodiment, similar to the configuration of the first exemplary embodiment, is provided with the first optical portion L10 having a positive power, the second optical portion L20 including the first diffraction element 50 and having a positive power, the third optical portion L30 having positive power, and the fourth optical portion L40 including the second diffraction element 70 of a reflection type and having a positive power.

The imaging light generation device 31 of the present exemplary embodiment includes a laser light source 316, a collimating lens 317, and a micromirror device 318, and generates an image by scanning the laser light source 316 by driving the micromirror device 318. Thus, in the present exemplary embodiment, the imaging light generation device 31 itself forms the light of the angle of view.

According to the display device equipped with the optical system 10B of the present exemplary embodiment, even when a change in temperature occurs due to body temperature or the heat of the display device itself, causing the spectrum width of the laser light to fluctuate, a high-quality image can be displayed by wavelength compensation.

Fourth Exemplary Embodiment

Next, a fourth exemplary embodiment will be described. The present exemplary embodiment relates to another mode of the display device. Note that, in the description below, components common to those of the first exemplary embodiment will be given identical reference numerals and detailed description thereof will be omitted.

Figure 12:
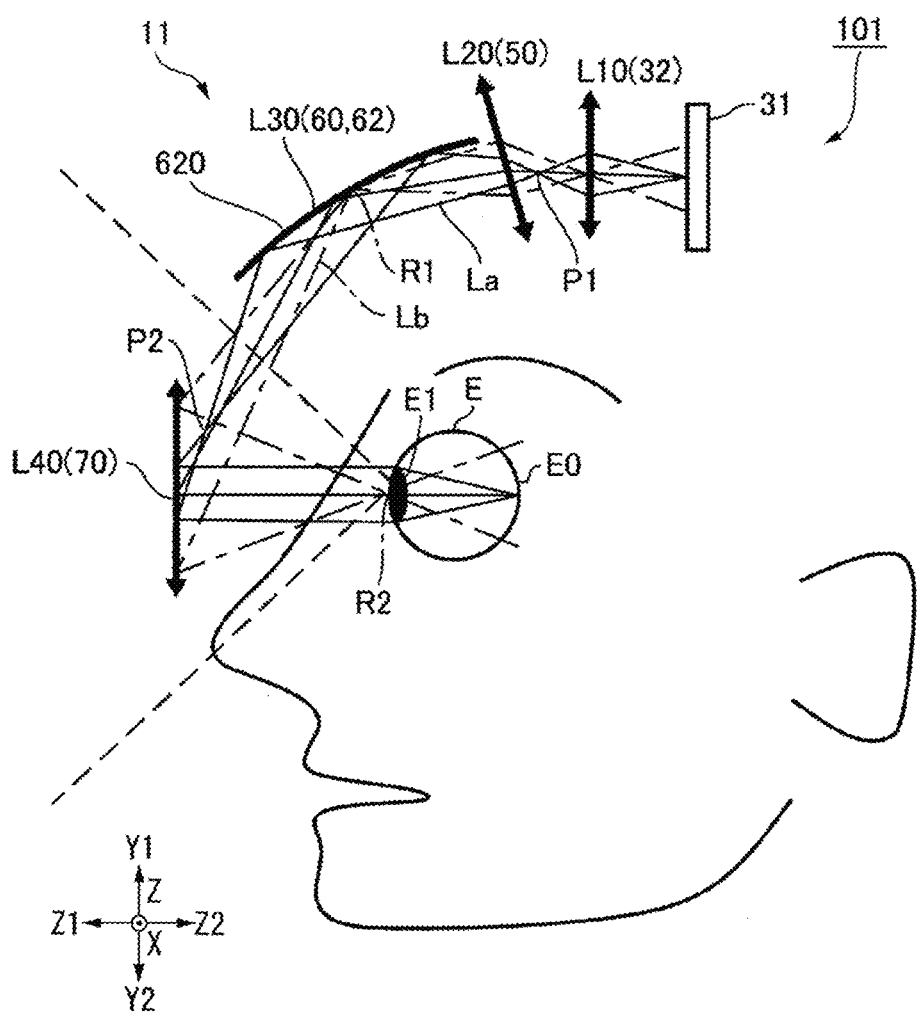
FIG. 12 is an explanatory view of the display device according to a fourth exemplary embodiment.

FIG. 12 is an explanatory view of the display device according to the fourth exemplary embodiment. FIG. 12 illustrates the configuration of the optical system on the primary diffraction plane, and the directions indicated by XYZ in FIG. 12 coincide with the directions in FIG. 1 and FIG. 2.

As illustrated in FIG. 12, a display device 101 of the present exemplary embodiment causes the imaging light to travel from the upper side Y1 to the lower side Y2, and emits the imaging light into the eye E of the observer.

In an optical system 11 of the display device 101 according to the present exemplary embodiment, as illustrated in FIG. 12, the optical system 11 is disposed in the up-down direction along the Y axis, and the projection optical system 32, the first diffraction element 50, and the light guide system 60 are disposed in an area from the imaging light generation device 31 disposed on top of the head to the second diffraction element 70 in front of the eye E. In an optical system 12 of the present exemplary embodiment, the imaging light L0 is greatly deflected along a surface parallel to the YZ plane, thereby guiding the eye E of the observer. Thus, in the optical system 12 of the present exemplary embodiment, the primary diffraction plane is defined by a surface parallel to the YZ plane illustrated in FIG. 12.

In the present exemplary embodiment, the light guide system 60 is constituted by the mirror 62 having the reflection surface 620 with a center that is recessed from a peripheral portion, and has a positive power. The reflection surface 620 is a spherical surface, an aspherical surface, a free form surface, or the like. In the present exemplary embodiment, the reflection surface 620 is constituted by a free form surface. The first diffraction element 50 is formed by integrating a transmissive volume holographic element and a lens, and has a positive power. Note that the first diffraction element 50 itself may be configured to have a positive power.

Although not illustrated in the drawings, similar to the exemplary embodiments described above, in the optical system 12 of the present exemplary embodiment as well, the power in the secondary diffraction plane is configured to be smaller than the power in the primary diffraction plane, the number of intermediate images and pupils of the imaging light formed on the primary diffraction plane is configured to be greater than the number of intermediate images and pupils of the imaging light formed on the secondary diffraction plane, or the first distance H1 is configured to be greater than the second distance H2.

Thus, the deflection force in the primary diffraction plane of the imaging light is greater than the deflection force in the secondary diffraction plane.

The optical system 11 of the present exemplary embodiment is provided with the first optical portion L10 (projection optical system 32) having a positive power, the second optical portion L20 including the first diffraction element 50 and having a positive power, the third optical portion L30 (mirror 62 of the light guide 60) having a positive power, and the fourth optical portion L40 including the second diffraction element 70 of a reflection type and having a positive power, along an optical path of imaging light emitted from the imaging light generation device 31. Thus, the first intermediate image P1 of imaging light is formed between the first optical portion L10 and the third optical portion L30, the pupil R1 is formed in the vicinity of the third optical portion L30, the second intermediate image P2 of imaging light is formed between the third optical portion L30 and the fourth optical portion L40, and the fourth optical portion L4 collimates the imaging light to form the exit pupil R2.

Here, the third optical portion L30 is constituted by the mirror 62 having a positive power. Accordingly, the diverging light diffracted by the second optical portion L20 is converged by the mirror 62. Further, the converged light is incident on a point where light of the specific wavelength of the fourth optical portion L40 (second diffraction element 70) is incident and in the vicinity thereof.

According to the optical system 11 of the present exemplary embodiment, the power of each of the optical portions is suppressed in the secondary diffraction plane, making it possible to alleviate assembly tolerances of optical components such as lenses constituting the optical portions.

Further, in the optical system 11 of the present exemplary embodiment as well, similar to the configuration of the first exemplary embodiment, the four conditions are satisfied in the primary diffraction plane. Thus, in the first diffraction element 50 and the second diffraction element 70, the light beams can be made incident at a location where the interference fringes are the same, and chromatic aberration can be canceled by properly performing wavelength compensation. Thus, degradation of the resolution of the imaging light can be suppressed. Note that, while condition 3 and condition 4 described above are not satisfied in the secondary diffraction plane, the occurrence of chromatic aberration can be generally canceled by causing light of peripheral wavelengths of the specific wavelength to be generally incident in the vicinity of light of the specific wavelength.

Modified Example of Fourth Exemplary Embodiment

Next, a modified example of the display device according to the fourth exemplary embodiment will be described.

Figure 13:
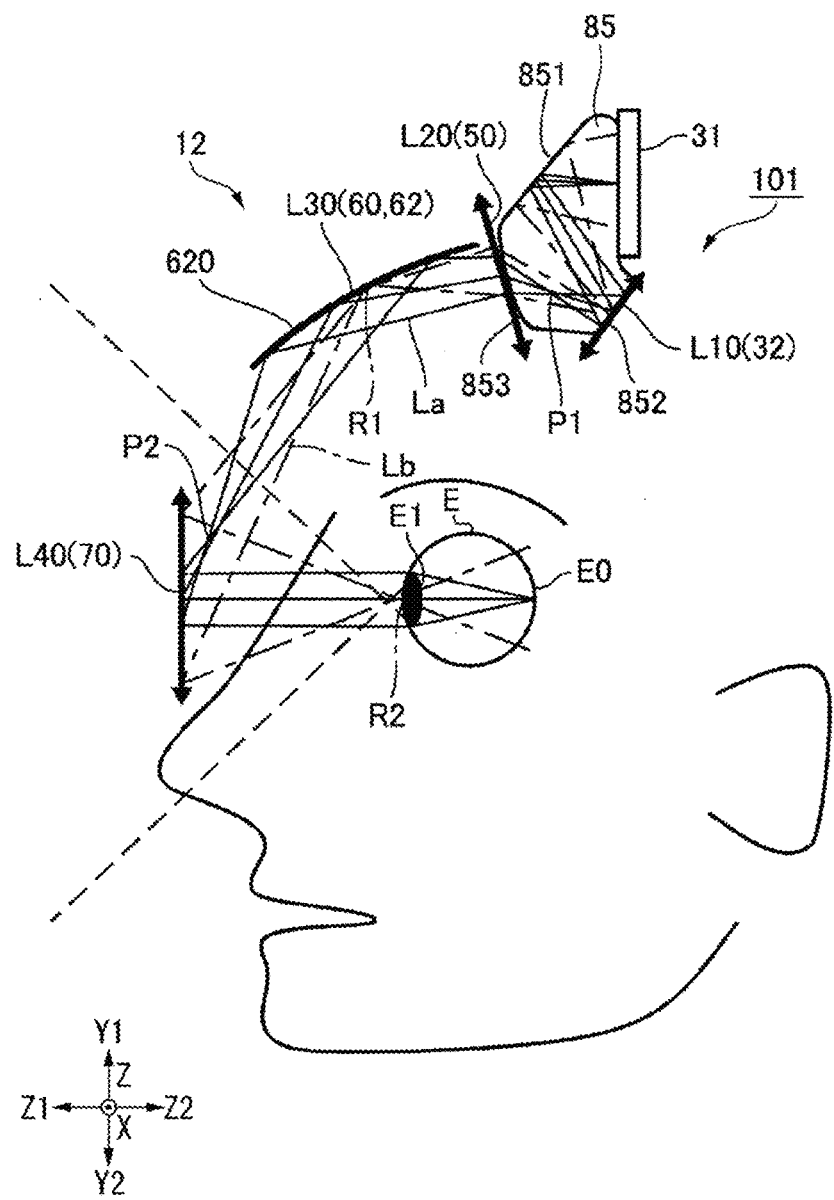
FIG. 13 is an explanatory view of the display device according to a modified example of the fourth exemplary embodiment.
Figure 14:
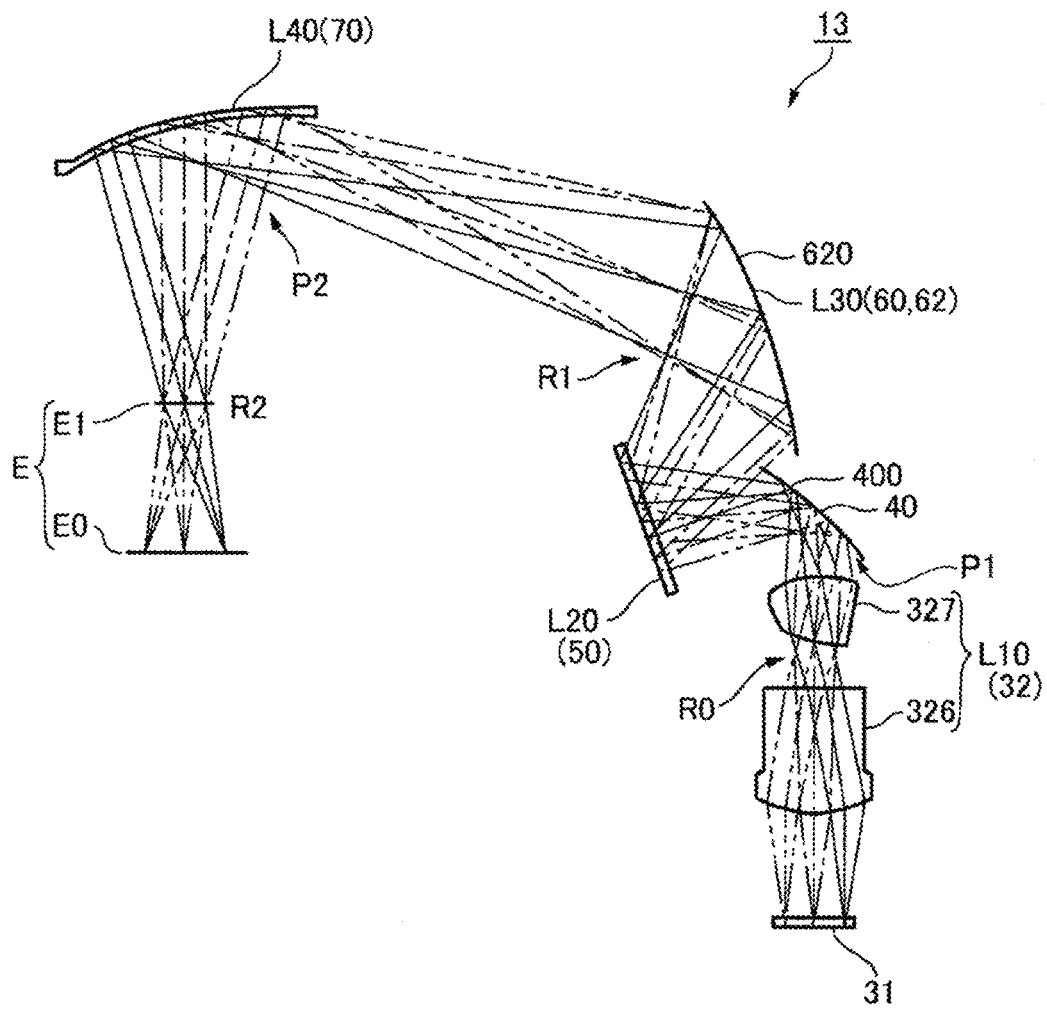
FIG. 14 is a diagram illustrating a schematic configuration of the optical system according to a fifth exemplary embodiment.

FIG. 13 is an explanatory view of the display device according to a modified example of the fourth exemplary embodiment. Note that FIG. 13 illustrates a configuration of the primary diffraction plane. In the optical system 12 illustrated in FIG. 13, the first optical portion L10 (projection optical system 32) and the second optical portion L20 (first diffraction element 50) are separate bodies. In the optical system 12 of the present modified example, however, as illustrated in FIG. 14, the first optical portion L10 (projection optical system) and the second optical portion L20 (first diffraction element 50) are integrated. More specifically, the first optical portion L10 (projection optical system 32) is constituted by a prism 85 provided with a plurality of reflection surfaces 851, 852, and the second optical portion L20 (first diffraction element 50 of a transmission type) is configured on an exit surface 853 of the prism 85.

The other components are common to the components illustrated in FIG. 13. Therefore, the same effects as those illustrated in FIG. 13 can be achieved. Furthermore, with use of the prism 85, because the first optical portion L10 (projection optical system 32) and the second optical portion L20 (first diffraction element 50) are integrated, it is possible to decrease assembly tolerances, reduce the size in the front-back direction of the head, and the like.

Fifth Exemplary Embodiment

Next, a configuration of the optical system according to a fifth exemplary embodiment will be described. In the description below, components common to those of the first exemplary embodiment will be given identical reference numerals and detailed description thereof will be omitted.

FIG. 14 is a diagram illustrating a schematic configuration of the optical system according to the fifth exemplary embodiment. Note that FIG. 14 illustrates a configuration of the optical system of the primary diffraction plane. The optical system 13 of the present exemplary embodiment illustrated in FIG. 14, similar to the first exemplary embodiment, is provided with the first optical portion L10 having a positive power, the second optical portion L20 including the first diffraction element 50 and having a positive power, the third optical portion L30 having positive power, and the fourth optical portion L40 including the second diffraction element 70 of a reflection type and having a positive power, along the optical path of imaging light emitted from the imaging light generation device 31. Note that FIG. 14 illustrates a light beam diagram of the primary diffraction plane of the optical system 13.

In the present exemplary embodiment, the light guide system 60 is constituted by the mirror 62 having the reflection surface 620 with a center that is recessed from the peripheral portion, and has a positive power. The reflection surface 620 is a spherical surface, an aspherical surface, a free form surface, or the like. In the present exemplary embodiment, the reflection surface 620 is constituted by a free form surface. The mirror 40 is disposed at a middle position in the optical path extending from the projection optical system 32 to the first diffraction element 50. The mirror 40 includes a reflection surface 400 that is a recessed curved surface, and has a positive power.

The projection optical system 32 of the present exemplary embodiment includes a lens 326 that is rotationally symmetrical, and a free form lens 327.

In the optical system 13 of the present exemplary embodiment, the pupil R0 is formed between the lenses 326, 327 of the first optical portion L10, the pupil R1 is formed in the vicinity of the third optical portion L30, and the second intermediate image P2 of the imaging light is formed between the third optical portion L30 and the fourth optical portion L40. Then, the fourth optical portion L40 collimates the imaging light to form the exit pupil R2. Thus, in the optical system 13 of the present exemplary embodiment, the first intermediate image P1 is formed in the first optical portion L10 (projection optical system 32).

Although not illustrated in the drawings, similar to the exemplary embodiments described above, in the optical system 13 of the present exemplary embodiment as well, the power in the secondary diffraction plane is configured to be smaller than the power in the primary diffraction plane, the number of intermediate images and pupils of the imaging light formed on the primary diffraction plane is configured to be greater than the number of intermediate images and pupils of the imaging light formed on the secondary diffraction plane, or the first distance H1 is configured to be greater than the second distance H2.

Thus, the deflection force in the primary diffraction plane of the imaging light is greater than the deflection force in the secondary diffraction plane.

According to the optical system 13 of the present exemplary embodiment, the power of each of the optical portions is suppressed in the secondary diffraction plane, making it possible to alleviate assembly tolerances of optical components such as lenses constituting the optical portions.

Further, in the optical system 13 of the present exemplary embodiment as well, similar to the configuration of the exemplary embodiments described above, the four conditions are satisfied in the primary diffraction plane. Thus, in the first diffraction element 50 and the second diffraction element 70, the light beams can be made incident at a location where the interference fringes are the same, and chromatic aberration can be canceled by properly performing wavelength compensation. Thus, degradation of the resolution of the imaging light can be suppressed. Note that, while condition 3 and condition 4 described above are not satisfied in the secondary diffraction plane, the occurrence of chromatic aberration can be generally canceled by causing light of peripheral wavelengths of the specific wavelength to be generally incident in the vicinity of light of the specific wavelength.

In addition, of the members illustrated in FIG. 14, an optical member having a combination of high dispersion and low dispersion is used for the plastic, glass, or the like constituting the transmissive member. Further, because the mirror 62 is used in the third optical portion L30, there is an achromatic state in the first optical portion L10. Therefore, the center of gravity position of the optical system 13 moves to the back side Z2, resulting in the advantage that the burden on the nose of the user can be reduced. Further, with respect to the mirror 62, when a semi-transparent mirror layer or an angle selective mirror layer is formed by a sputtering method or the like on a transparent member such as a transparent resin or glass, it is possible to visually recognize the outside world via the mirror 62.

First Modified Example of Fifth Exemplary Embodiment

Next, the optical system according to a first modified example of the fifth exemplary embodiment will be described.

Figure 15:
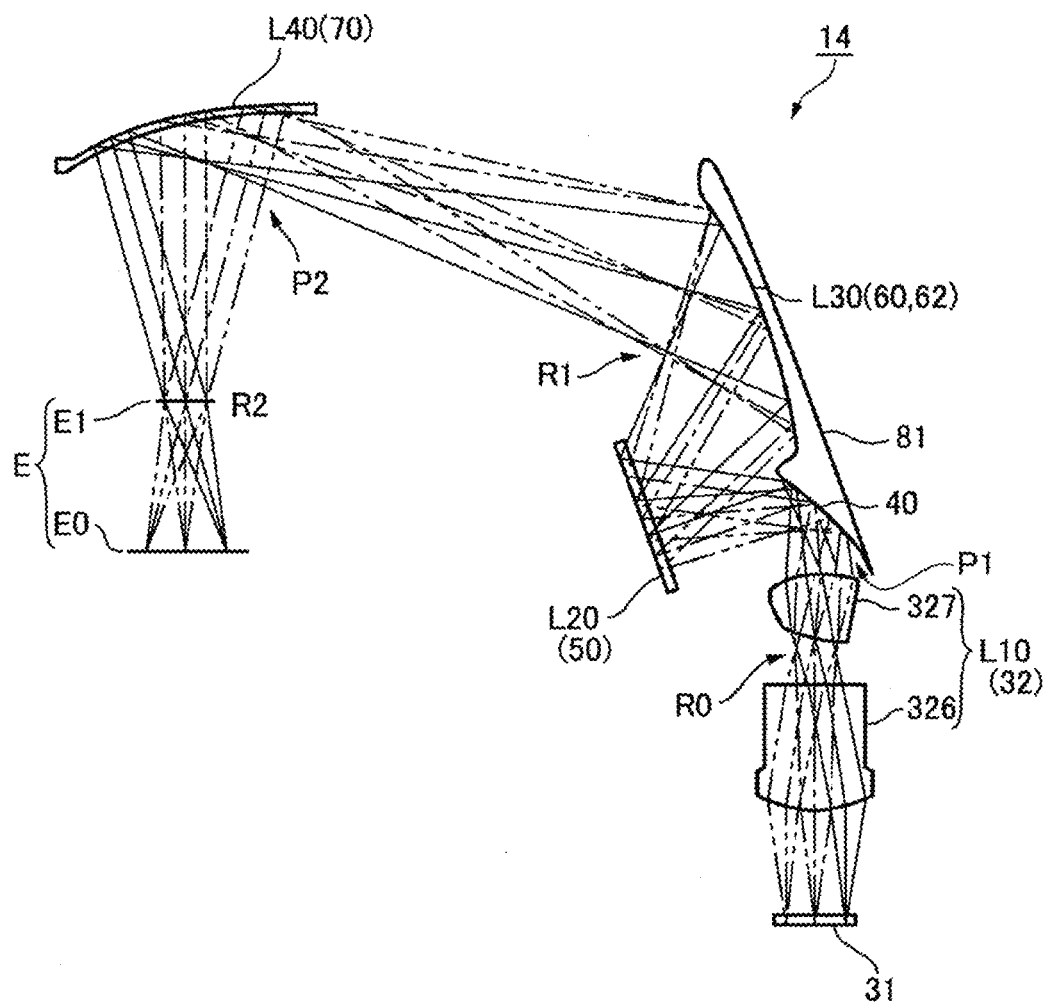
FIG. 15 is an explanatory view of the optical system of a first modified example of the fifth exemplary embodiment.

FIG. 15 is an explanatory view of the optical system according to a first modified example of the fifth exemplary embodiment. Note that FIG. 15 illustrates a configuration of the optical system of the primary diffraction plane. Similar to the fifth exemplary embodiment described with reference to FIG. 15, an optical system 14 illustrated in FIG. 15 is provided with the projection optical system 32 (first optical portion L10) from the imaging light generation device 31 disposed on a side head portion to the second diffraction element 70 (fourth optical portion L40) in front of the eye E, the mirror 40, the first diffraction element 50 (second optical portion L20), and the mirror 62 (third optical portion L30) of the light guide system 60.

In the present modified example, the mirror 40 and the mirror 62 are configured on different surfaces of a common member 81. The other components are common to those of the fifth exemplary embodiment. Therefore, according to the configuration of the present modified example, in addition to the same effects as those of the optical system 13 of the fifth exemplary embodiment, the mirror 40 and the mirror 62 are configured on the common member 81, making it possible to reduce assembly tolerances and the like. Further, types of molds used to manufacture the mirrors can be reduced, making it possible to reduce costs.

Second Modified Example of Fifth Exemplary Embodiment

Next, the optical system according to a second modified example of the fifth exemplary embodiment will be described.

Figure 16:
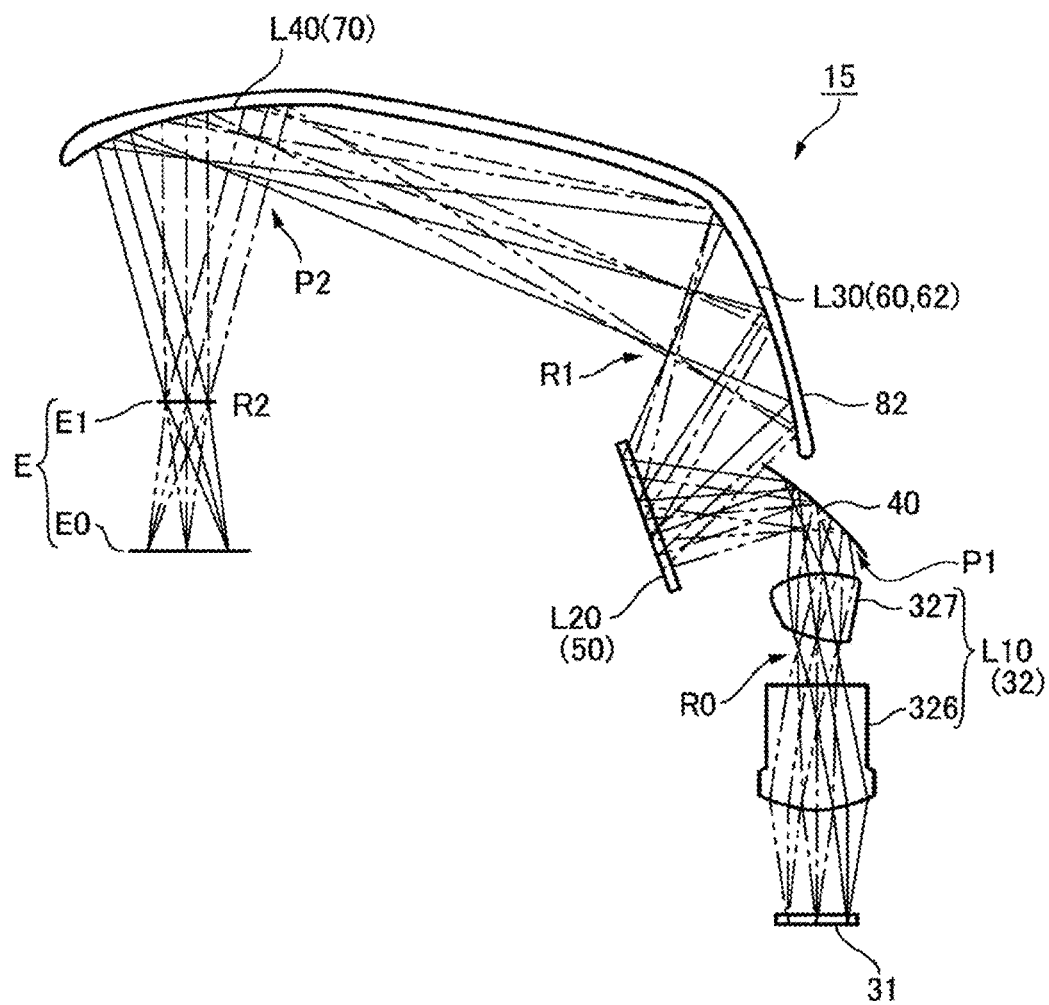
FIG. 16 is an explanatory view of the optical system of a second modified example of the fifth exemplary embodiment.

FIG. 16 is an explanatory view of the optical system according to the second modified example of the fifth exemplary embodiment. Note that FIG. 16 illustrates a configuration of the optical system of the primary diffraction plane. Similar to the fifth exemplary embodiment, an optical system 15 illustrated in FIG. 16 is provided with the projection optical system 32 (first optical portion L10) from the imaging light generation device 31 disposed on the side head portion to the second diffraction element 70 (fourth optical portion L40) in front of the eye E, the mirror 40, the first diffraction element 50 (second optical portion L20), and the mirror 62 (third optical portion L30) of the light guide system 60.

In the present modified example, the mirror 62 and the second diffraction element 70 are configured on different surfaces of a common member 82. The other components are common to those of the fifth exemplary embodiment. Therefore, according to the configuration of the present modified example, in addition to the same effects as those of the optical system 13 of the fifth exemplary embodiment, the mirror 62 and the second diffraction element 70 are configured on the common member 82, making it possible to reduce assembly tolerances and the like. Further, the types of molds used to manufacture the mirrors can be reduced, making it possible to reduce costs.

Third Modified Example of Fifth Exemplary Embodiment

Next, the optical system according to a third modified example of the fifth exemplary embodiment will be described.

Figure 17:
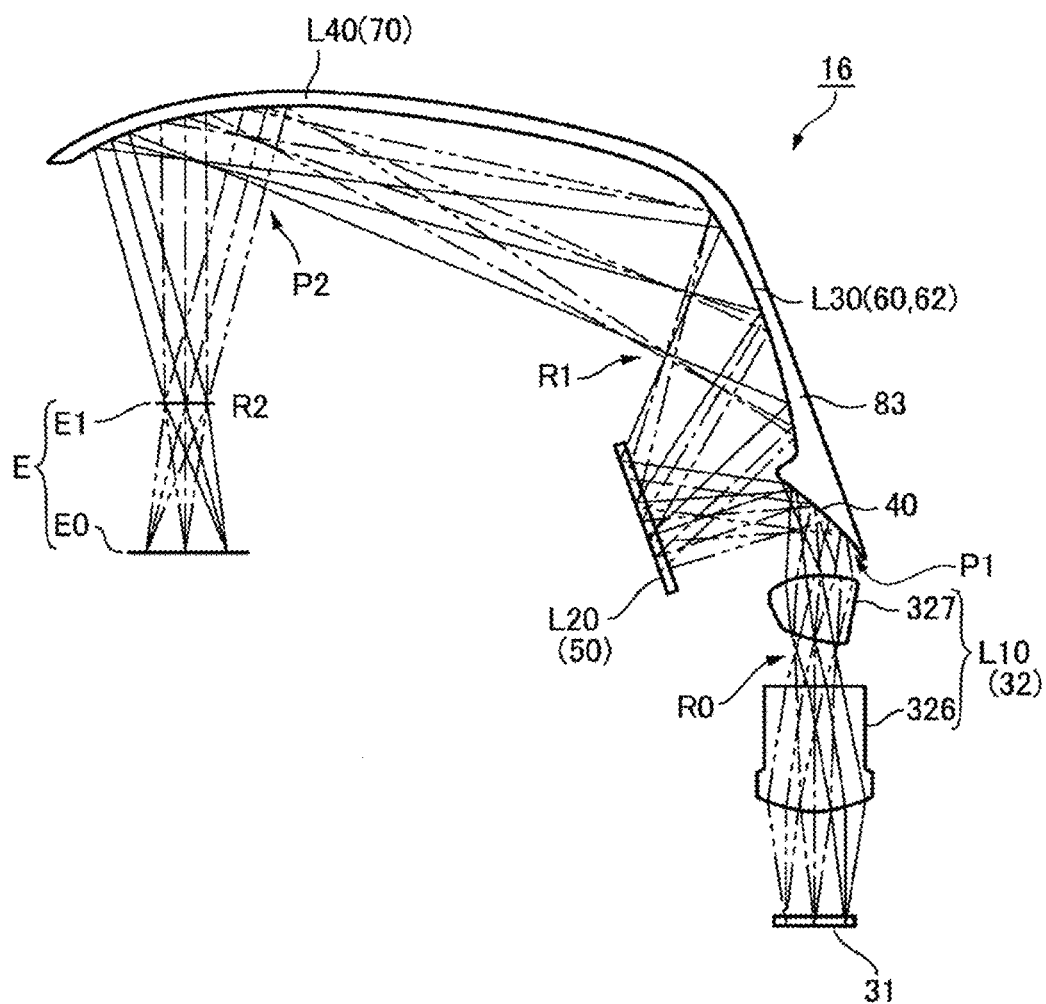
FIG. 17 is an explanatory view of the optical system of a third modified example of the fifth exemplary embodiment.

FIG. 17 is an explanatory view of the optical system according to the third modified example of the fifth exemplary embodiment. Note that FIG. 17 illustrates a configuration of the optical system of the primary diffraction plane.

Similar to the fifth exemplary embodiment, an optical system 16 illustrated in FIG. 17 is provided with the projection optical system 32 (first optical portion L10) from the imaging light generation device 31 disposed on the side head portion to the second diffraction element 70 (fourth optical portion L40) in front of the eye E, the mirror 40, the first diffraction element 50 (second optical portion L20), and the mirror 62 (third optical portion L30) of the light guide system 60.

In the present modified example, the mirror 40, the mirror 62, and the second diffraction element 70 are configured on different surfaces of a common member 83. The other components are common to those of the fifth exemplary embodiment. Therefore, according to the configuration of the present modified example, in addition to the same effects as those of the optical system 13 of the fifth exemplary embodiment, the mirror 40, the mirror 62, and the second diffraction element 70 are configured on the common member 83, making it possible to reduce assembly tolerances and the like. Further, the types of molds used to manufacture the mirrors can be reduced, making it possible to reduce costs.

While exemplary embodiments of the present disclosure are described above, the present disclosure is not limited to the contents thereof, and may be changed as appropriate without departing from the gist of the disclosure.

For example, while the exemplary embodiments described above focus on a case in which the first diffraction element 50 and the second diffraction element 70 are in a fully conjugate relationship in the primary diffraction plane, the power may be set so that the first diffraction element 50 and the second diffraction element 70 are in a substantially conjugate relationship in the primary diffraction plane.

Figure 18:
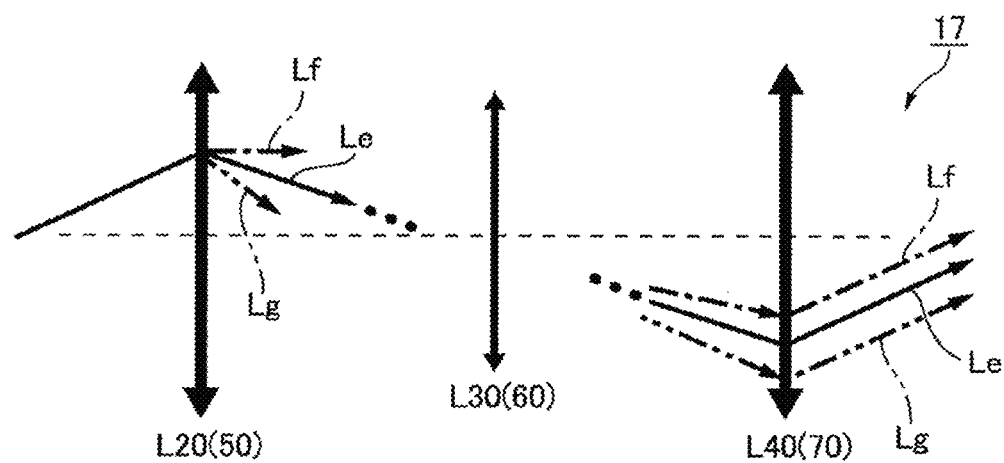
FIG. 18 is a diagram illustrating a substantially conjugate relationship between the first diffraction element and the second diffraction element.
Figure 19:
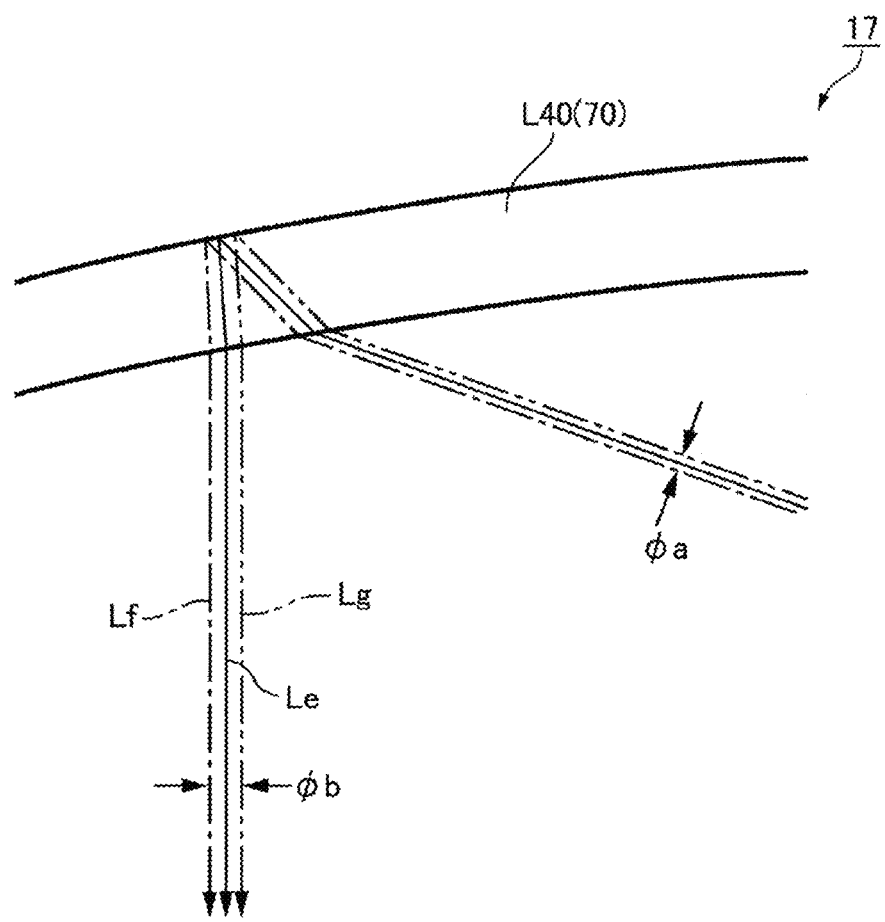
FIG. 19 is an explanatory view of light emitted from the second diffraction element when in the substantially conjugate relationship illustrated in FIG. 18.
Figure 20:
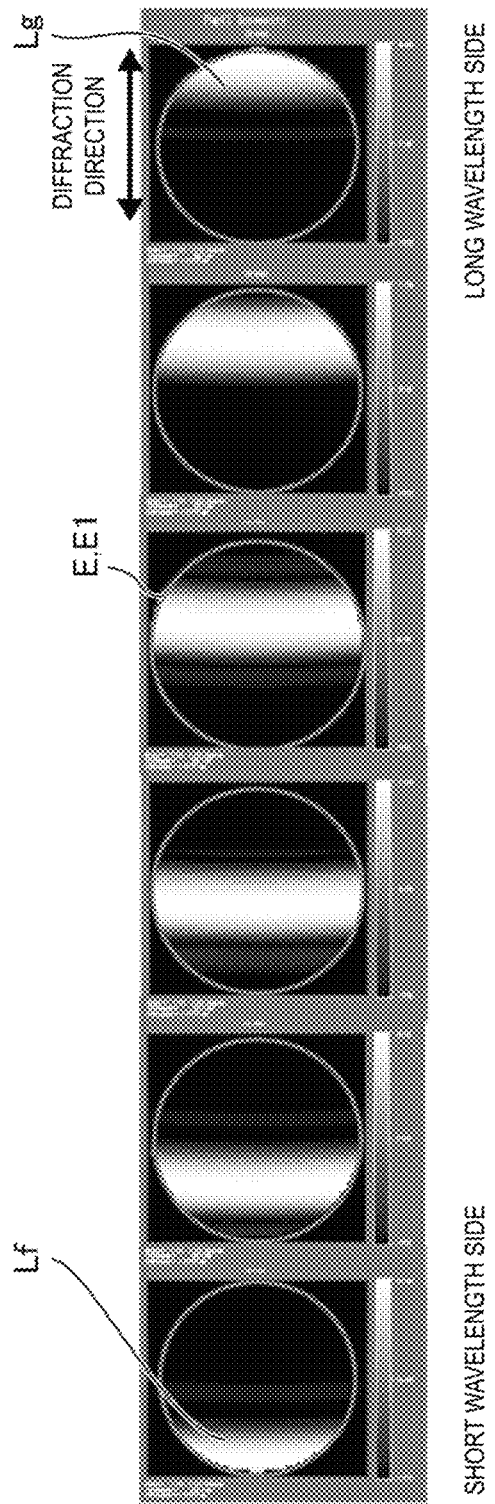
FIG. 20 is an explanatory view illustrating a state in which the light illustrated in FIG. 19 is incident on an eye.

FIG. 18 is an explanatory view of a case where the first diffraction element 50 and the second diffraction element 70 have a substantially conjugate relationship. FIG. 19 is an explanatory view of light emitted from the second diffraction element 70 when in the substantially conjugate relationship illustrated in FIG. 18. FIG. 20 is an explanatory view illustrating a state in which the light illustrated in FIG.

19 is incident on the eye E. Note that, in FIG. 18, light of the specific wavelength is indicated by the solid line Le, light of a wavelength equivalent to the specific wavelength −10 nm is indicated by the dot-dash line Lf, and light of a wavelength equivalent to the specific wavelength +10 nm is indicated by the two-dot chain line Lg. FIG. 20 shows light having a wavelength of the specific wavelength −10 nm (light indicated by dot-dash line Lf in FIG. 19) incident on the eye E on the far left, light having a wavelength of the specific wavelength +10 nm (light indicated by the two-dot chain line Lg in FIG. 19) incident on the eye E on the far right, and light having wavelengths varied from the specific wavelength −10 nm to the specific wavelength +10 nm incident on the eye E in the middle. Note that, while light of the specific wavelength incident on the eye E is not shown in FIG. 20, light of the specific wavelength incident on the eye E is an intermediate state between the state shown third from the left and the state shown fourth from the left.

In an optical system 17 of the present modified example, when the first diffraction element 50 and the second diffraction element 70 are in a substantially conjugate relationship, the state of incidence on the second diffraction element 70 is different for light of peripheral wavelengths that deviate from the specific wavelength. Here, in the second diffraction element 70, the number of interference fringes decreases as the distance to the optical axis decreases, and the light bending force is weak. Therefore, when light on the long wavelength side is incident on the optical axis side and light on the short wavelength side is incident toward the end, light of the specific wavelength and light of peripheral wavelengths are collimated, making it possible to obtain the same effects as wavelength compensation.

In this case, because the light beam position deviates according to wavelength, as illustrated in FIG. 19, the diameter of the light beam incident on the pupil increases from a diameter φa to a diameter φb. FIG. 20 shows the states of light beam intensity incident on the pupil at that time. As is understood from FIG. 20, while the pupil cannot be filled in the vicinity of the specific wavelength, light of peripheral wavelengths is incident on a position deviated from the light of the specific wavelength, making it possible to fill the pupil diameter. As a result, the observer can obtain advantages such as improved viewability of the image.

Application to Other Display Devices

While the display apparatus 100 of a head-mounted type is illustrated in the exemplary embodiments described above, the present disclosure may be applied to a head-up display, a handheld display, a projector optical system, or the like.

What is claimed is:

1. A display device comprising, along an optical path of imaging light emitted from an imaging light generation device:
   a first optical portion having a positive power;
   a second optical portion including a first diffraction element and having a positive power;
   a third optical portion having a positive power; and
   a fourth optical portion including a second diffraction element and having a positive power, wherein
   in the optical path, the first diffraction element and the second diffraction element are configured to diffract the imaging light at least along a primary diffraction plane and a secondary diffraction plane orthogonal to the primary diffraction plane, and
   a deflection force of the imaging light in the primary diffraction plane is greater than a deflection force of the imaging light in the secondary diffraction plane.

2. A display device comprising, along an optical path of imaging light emitted from an imaging light generation device:
   a first optical portion having a positive power;
   a second optical portion including a first diffraction element and having a positive power;
   a third optical portion having a positive power; and
   a fourth optical portion including a second diffraction element and having a positive power, wherein
   in the optical path, the first diffraction element and the second diffraction element are configured to diffract the imaging light at least along a primary diffraction plane and a secondary diffraction plane orthogonal to the primary diffraction plane and
   a number of intermediate images that is formed on the primary diffraction plane is greater than a number of intermediate images that is formed on the secondary diffraction plane.

3. A display device comprising, along an optical path of imaging light emitted from an imaging light generation device:
   a first optical portion having a positive power;
   a second optical portion including a first diffraction element and having a positive power;
   a third optical portion having a positive power; and
   a fourth optical portion including a second diffraction element and having a positive power, wherein
   in the optical path, the first diffraction element and the second diffraction element are configured to diffract the imaging light at least along a primary diffraction plane and a secondary diffraction plane orthogonal to the primary diffraction plane and
   a number of pupils of the imaging light that is formed on the primary diffraction plane is greater than a number of pupils of the imaging light that is formed on the secondary diffraction plane.

4. A display device comprising, along an optical path of imaging light emitted from an imaging light generation device:
   a first optical portion having a positive power;
   a second optical portion including a first diffraction element and having a positive power;
   a third optical portion having a positive power; and
   a fourth optical portion including a second diffraction element and having a positive power, wherein
   in the optical path, the first diffraction element and the second diffraction element are configured to diffract the imaging light at least along a primary diffraction plane and a secondary diffraction plane orthogonal to the primary diffraction plane,
   in the primary diffraction plane, a first intermediate image of the primary diffraction plane in the imaging light is formed between the first optical portion and the third optical portion, and a second intermediate image of the primary diffraction plane in the imaging light is formed between the third optical portion and the fourth optical portion,
   in the secondary diffraction plane, a first intermediate image of the secondary diffraction plane in the imaging light is formed between the first optical portion and the third optical portion, and a second intermediate image of the secondary diffraction plane in the imaging light is formed between the third optical portion and the fourth optical portion, and
   a first distance between the first intermediate image of the primary diffraction plane and the second intermediate image of the primary diffraction plane is greater than a second distance between the first intermediate image of the secondary diffraction plane and the second intermediate image of the secondary diffraction plane.

* * * * *